(12) United States Patent
Watanabe et al.

(10) Patent No.: US 11,064,029 B2
(45) Date of Patent: Jul. 13, 2021

(54) MICROSCOPE DEVICE, DATA PROCESSOR, AND SYSTEM

(71) Applicant: OLYMPUS CORPORATION, Tokyo (JP)

(72) Inventors: Hiroshi Watanabe, Tokyo (JP); Norikazu Urata, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 94 days.

(21) Appl. No.: 16/351,830

(22) Filed: Mar. 13, 2019

(65) Prior Publication Data

US 2019/0289078 A1    Sep. 19, 2019

(30) Foreign Application Priority Data

Mar. 15, 2018   (JP) .............................. JP2018-047375

(51) Int. Cl.
*H04L 29/08* (2006.01)
*G06F 11/30* (2006.01)
*G02B 21/36* (2006.01)

(52) U.S. Cl.
CPC .......... *H04L 67/125* (2013.01); *G02B 21/361* (2013.01); *G02B 21/362* (2013.01); *G06F 11/3065* (2013.01)

(58) Field of Classification Search
CPC ........ H04L 67/125; H04L 67/00; G06F 11/30; G06F 11/3065
See application file for complete search history.

(56) References Cited

U.S. PATENT DOCUMENTS

| | | | | |
|---|---|---|---|---|
| 6,711,283 | B1* | 3/2004 | Soenksen | H04N 1/1903 382/133 |
| 2006/0159325 | A1* | 7/2006 | Zeineh | G16H 30/40 382/128 |
| 2006/0159367 | A1* | 7/2006 | Zeineh | G06T 7/0012 382/276 |
| 2008/0155452 | A1* | 6/2008 | Mizusawa | G02B 21/365 715/772 |
| 2014/0226646 | A1* | 8/2014 | Nishigori | H04W 8/04 370/338 |
| 2017/0344107 | A1* | 11/2017 | Aghara | G02B 27/0179 |
| 2018/0344413 | A1* | 12/2018 | Rappel | G02B 21/365 |

FOREIGN PATENT DOCUMENTS

| | | |
|---|---|---|
| JP | 2001-057171 A | 2/2001 |
| JP | 2011-059179 A | 3/2011 |

* cited by examiner

*Primary Examiner* — Minh Chau Nguyen
(74) *Attorney, Agent, or Firm* — Scully, Scott, Murphy & Presser, P.C.

(57) ABSTRACT

A microscope device connected to a network includes a communication unit and a control unit. The communication unit receives master setting information from a data processor by communicating with the data processor over the network, and the master setting information includes multiple pieces of customizing setting information that correspond to multiple types of microscopy. The control unit registers or updates own-device-setting information of the microscope device in accordance with the master setting information received by the communication unit.

18 Claims, 49 Drawing Sheets

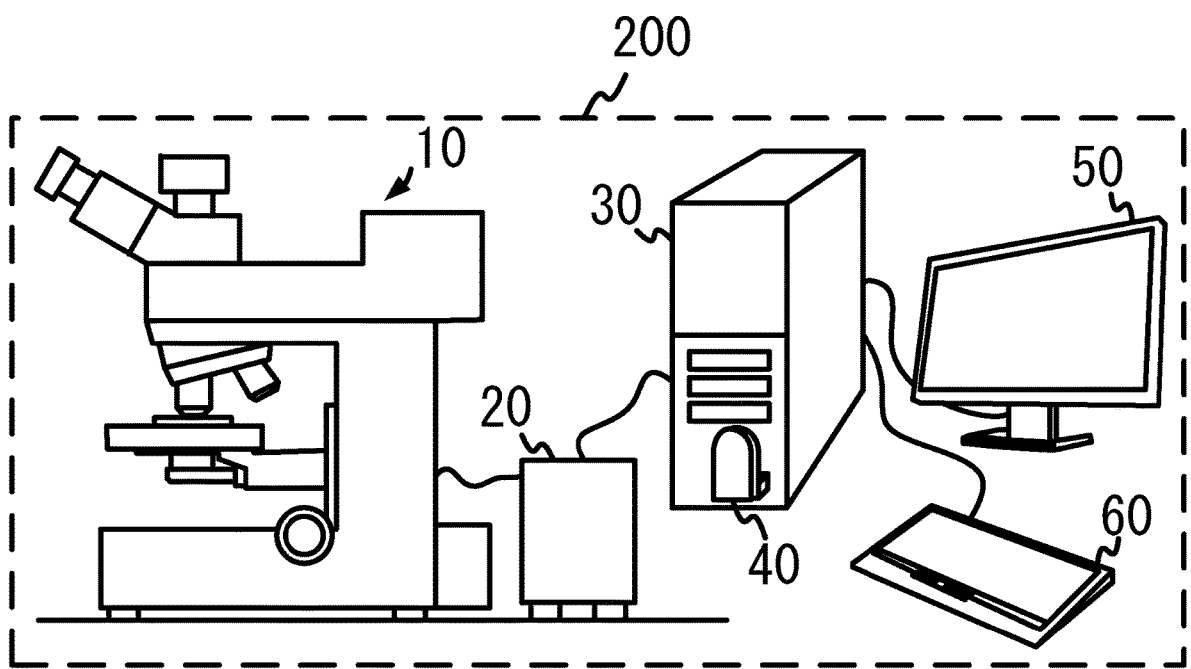
F I G. 3

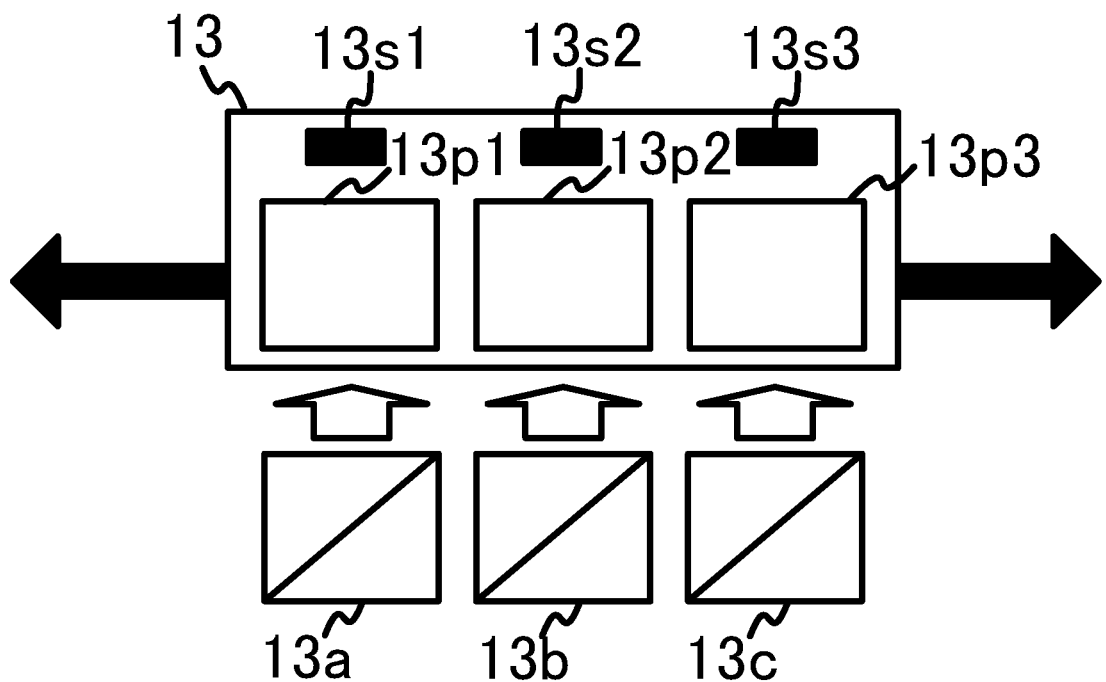
F I G. 5

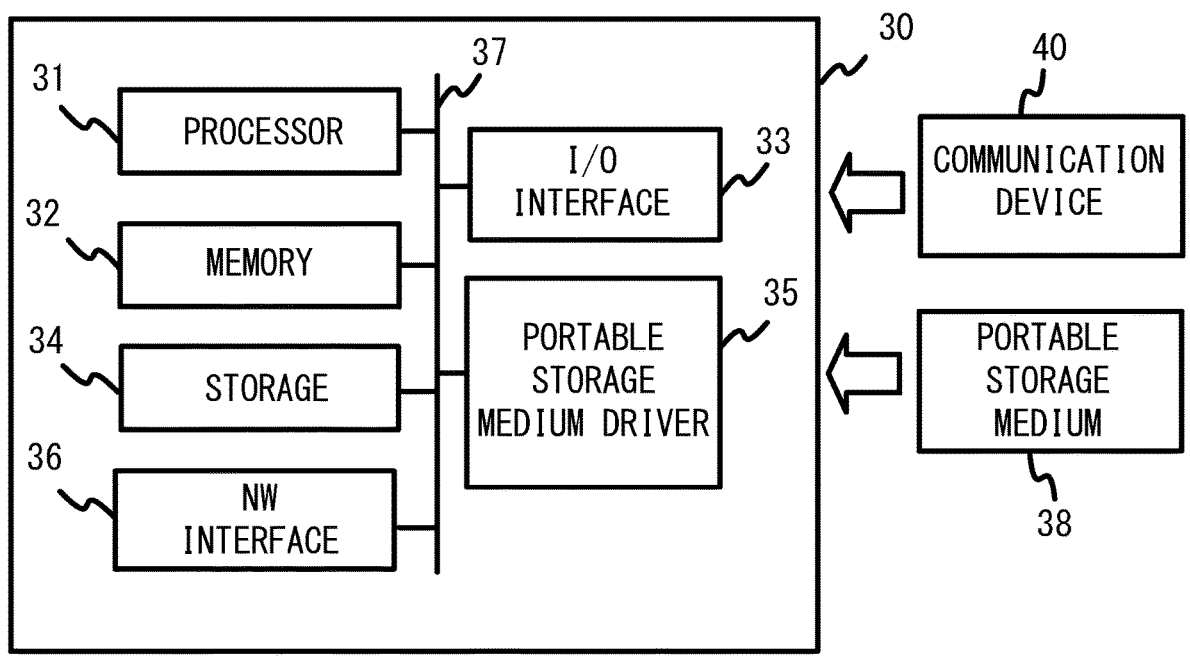
F I G. 7

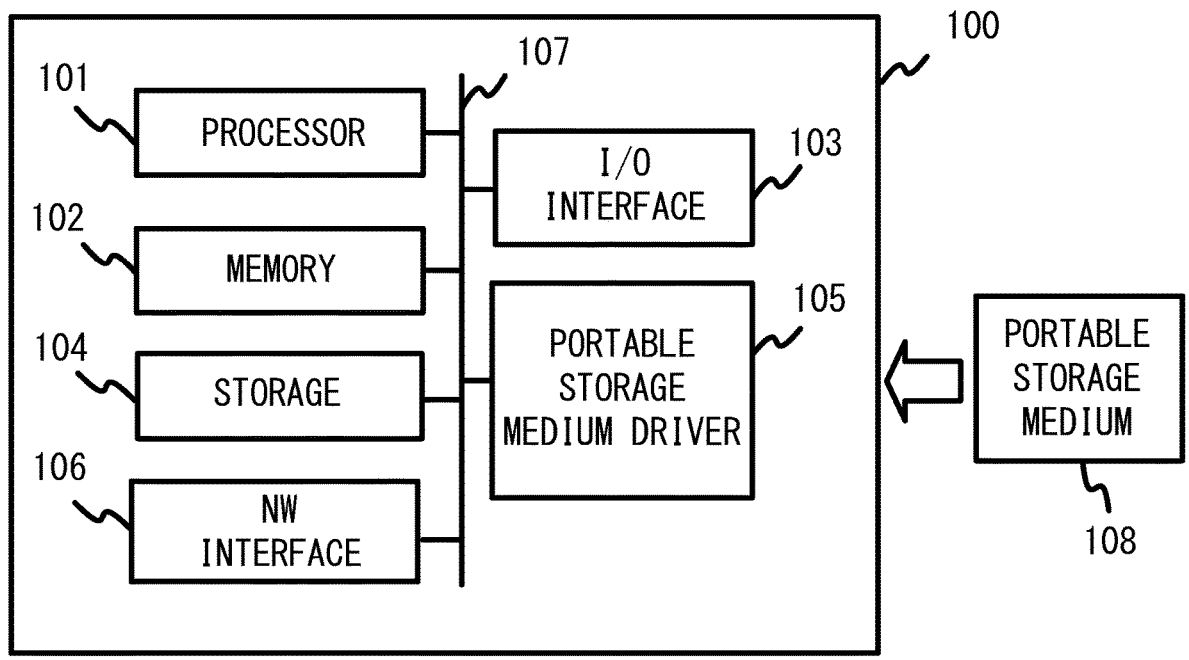
F I G. 8

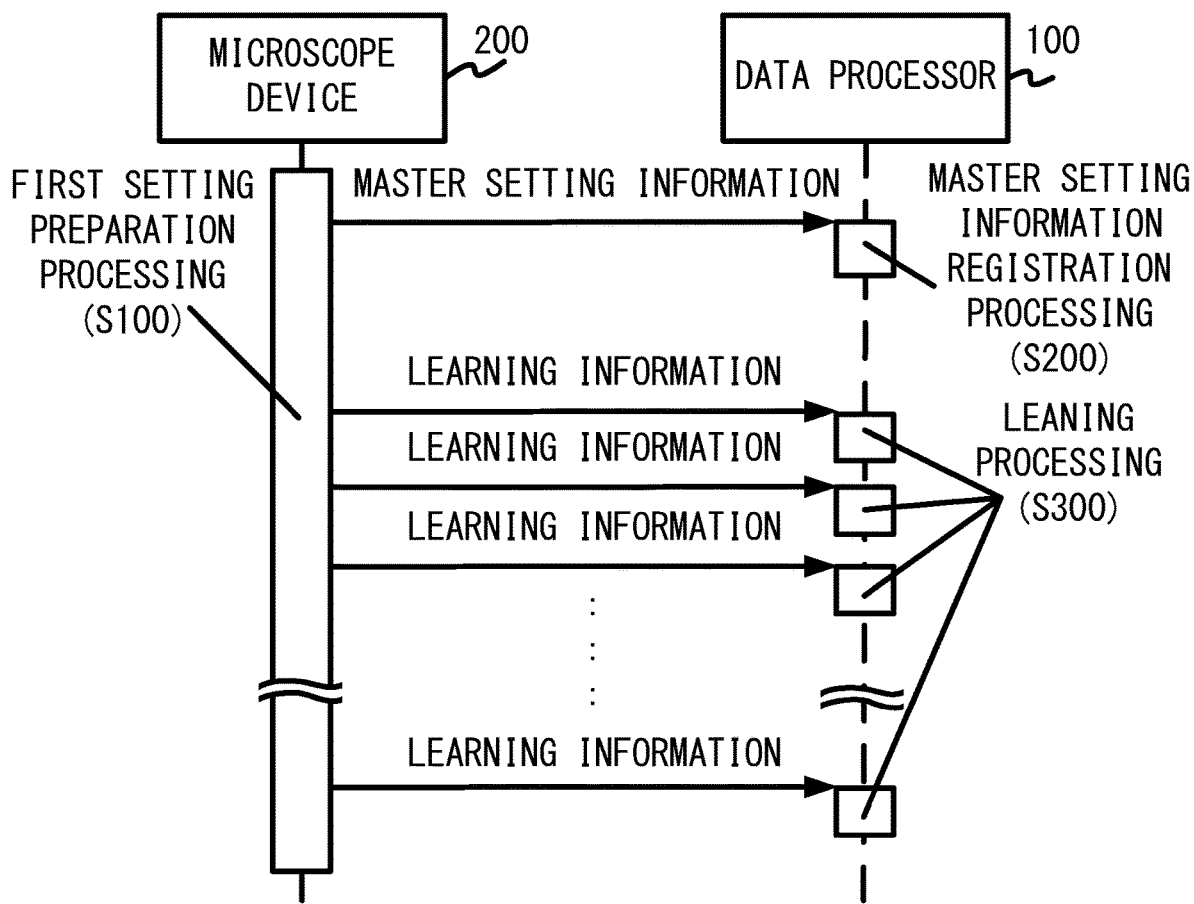
F I G. 9

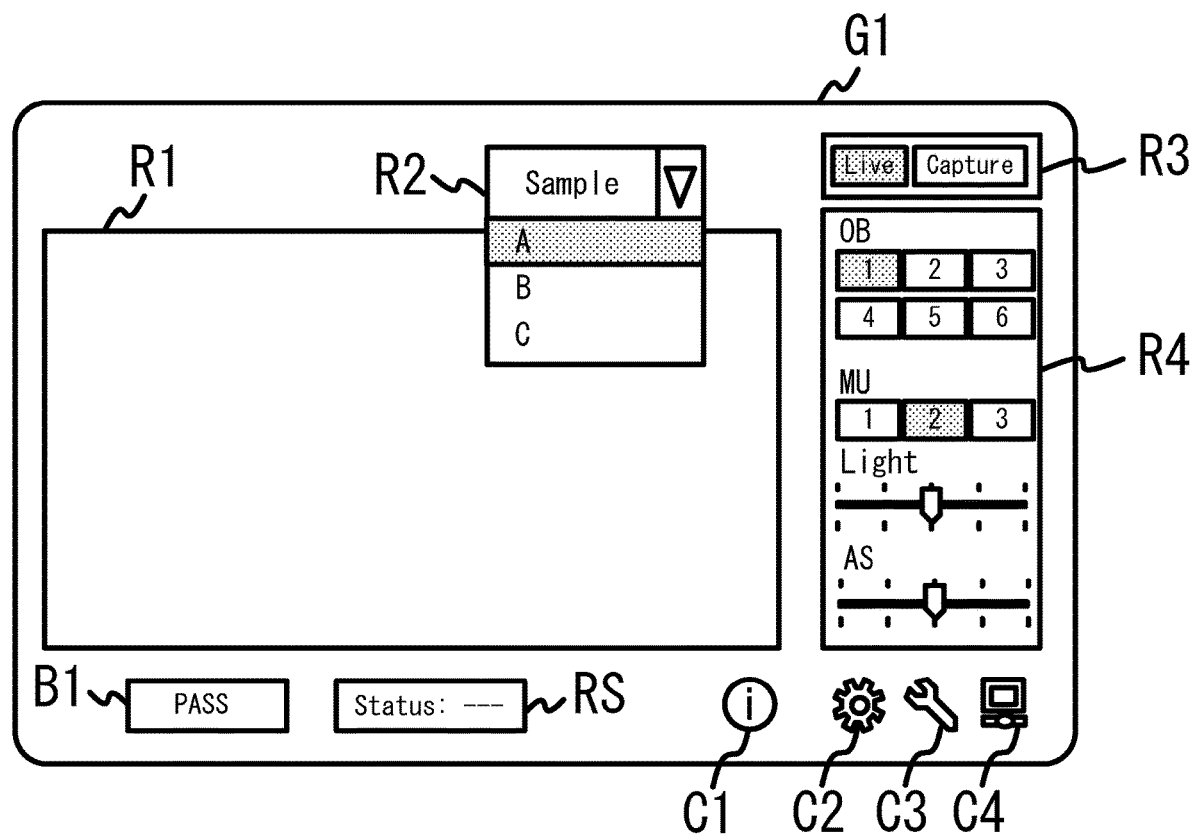
F I G. 1 5

| NOSEPIECE | | | ~ F1a |
|---|---|---|---|
| MOUNTING POSITION | TYPE OF OBJECTIVE | MAGNIFICATION OF OBJECTIVE | |
| 1 | MPLANFLNBD | 5× | |
| 2 | MPLANFLNBD | 10× | |
| 3 | MPLANFLNBD | 20× | |
| 4 | MPLANFLNBD | 50× | |
| 5 | MPLANFLNBD | 100× | |
| 6 | MPLANFLNBD | 150× | |

| MIRROR SLIDER | | ~ F1b |
|---|---|---|
| MOUNTING POSITION | TYPE OF MIRROR UNIT | |
| 1 | BF | |
| 2 | DF | |
| 3 | DIC | |

| MOUNTING POSITION OF OBJECTIVE | AS POSITION | AMOUNT OF LIGHT |
|---|---|---|
| 1 | 76.3 | 68 |
| 2 | 53.6 | 103 |
| 3 | 33 | 134 |
| 4 | 25.8 | 163 |
| 5 | 19.6 | 202 |
| 6 | 12.4 | 237 |

DF — F2b

| MOUNTING POSITION OF OBJECTIVE | AS POSITION | AMOUNT OF LIGHT |
|---|---|---|
| 1 | 100 | 255 |
| 2 | 100 | 255 |
| 3 | 100 | 255 |
| 4 | 100 | 255 |
| 5 | 100 | 255 |
| 6 | 100 | 255 |

DIC — F2c

| MOUNTING POSITION OF OBJECTIVE | AS POSITION | AMOUNT OF LIGHT |
|---|---|---|
| 1 | 76.3 | 255 |
| 2 | 53.6 | 255 |
| 3 | 33 | 255 |
| 4 | 25.8 | 255 |
| 5 | 19.6 | 255 |
| 6 | 12.4 | 255 |

FIG. 20

| | | |
|---|---|---|
| NOSEPIECE POSITION | 3 | |
| MIRROR SLIDER POSITION | 1 | ~ F3 |
| AMOUNT OF LIGHT | 200 | |
| AS POSITION | 70 | |
| EXPOSURE TIME | 20 | |
| SAMPLE | A | |

FIG. 23

SAMPLE C, MIRROR UNIT BF — F4c
SAMPLE B, MIRROR UNIT BF — F4b

SAMPLE A, MIRROR UNIT BF — F4a

| OBJECTIVE | | ACCEPTABLE EXPOSURE TIME | |
|---|---|---|---|
| TYPE | MAGNIFICATION | MIN VALUE | MAX VALUE |
| MPLANFLNBD | 5× | 720 | 890 |
| MPLANFLNBD | 10× | 900 | 1267 |
| MPLANFLNBD | 20× | 1300 | 2200 |
| MPLANFLNBD | 50× | 6300 | 8200 |
| MPLANFLNBD | 100× | 1130 | 1490 |
| MPLANFLNBD | 150× | 1600 | 1900 |

SAMPLE C, MIRROR UNIT DF — F4f
SAMPLE B, MIRROR UNIT DF — F4e

SAMPLE A, MIRROR UNIT DF — F4d

| OBJECTIVE | | ACCEPTABLE EXPOSURE TIME | |
|---|---|---|---|
| TYPE | MAGNIFICATION | MIN VALUE | MAX VALUE |
| MPLANFLNBD | 5× | 130000 | 150000 |
| MPLANFLNBD | 10× | 38000 | 42000 |
| MPLANFLNBD | 20× | 35000 | 40000 |
| MPLANFLNBD | 50× | 38000 | 42000 |
| MPLANFLNBD | 100× | 93000 | 11000 |
| MPLANFLNBD | 150× | 10000 | 12500 |

F I G. 2 4

F5

| time | Action |
|---|---|
| 2017/7/17,12:14:30 | Press Nosepiese button |
| 2017/7/17,12:14:30 | Send a request command of Switching Nosepiese to "Control Unit" |
| 2017/7/17,12:14:31 | Receive a positive answer command of Switching Nosepiese from "Control Unit" |
| 2017/7/17,12:14:31 | Complete moving Nosepiese |
| 2017/7/17,12:14:40 | Press PASS button |
| ... | ... |

F I G. 2 5

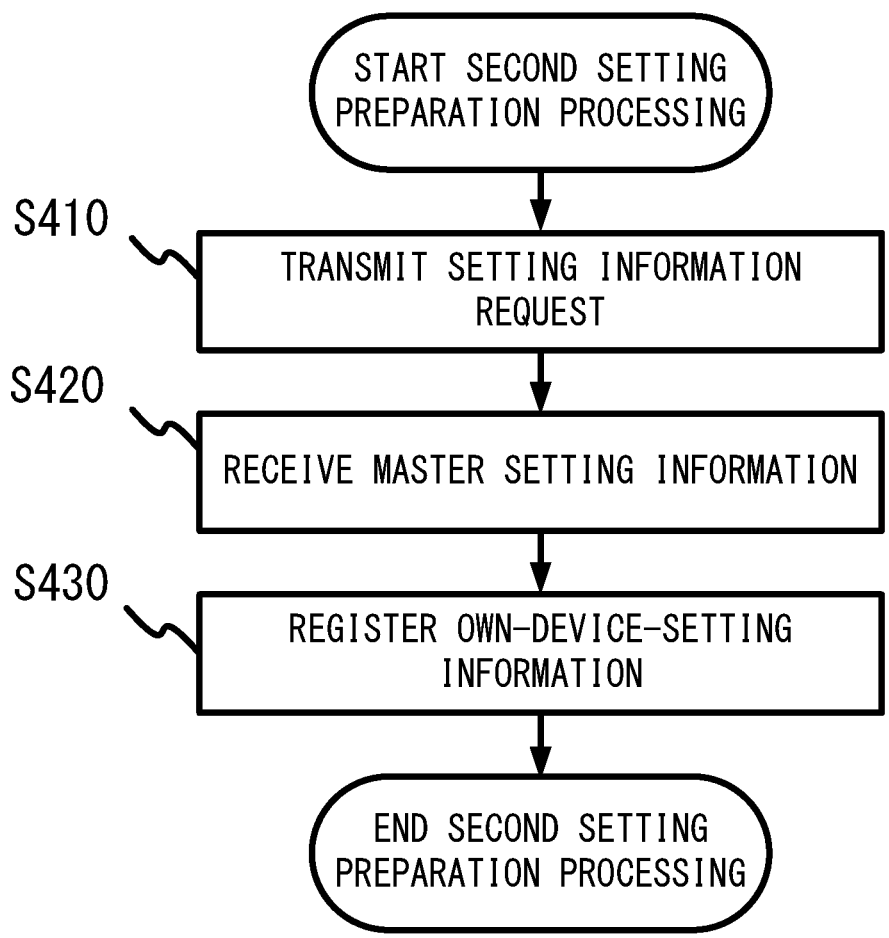
F I G. 2 7

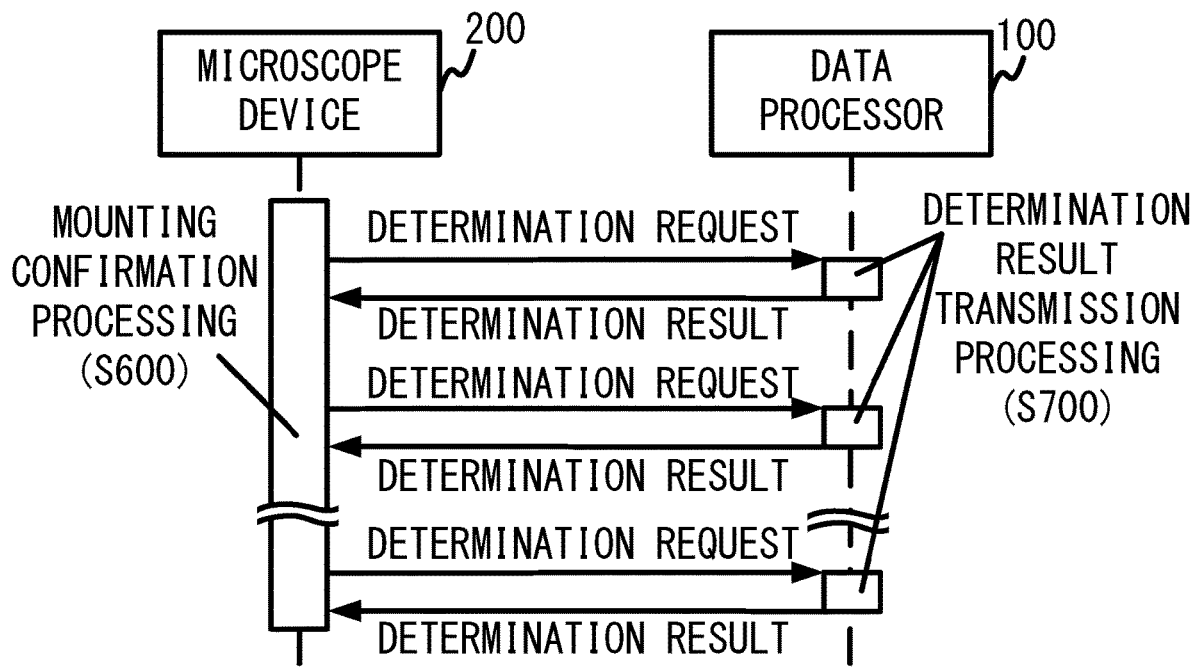
F I G. 29

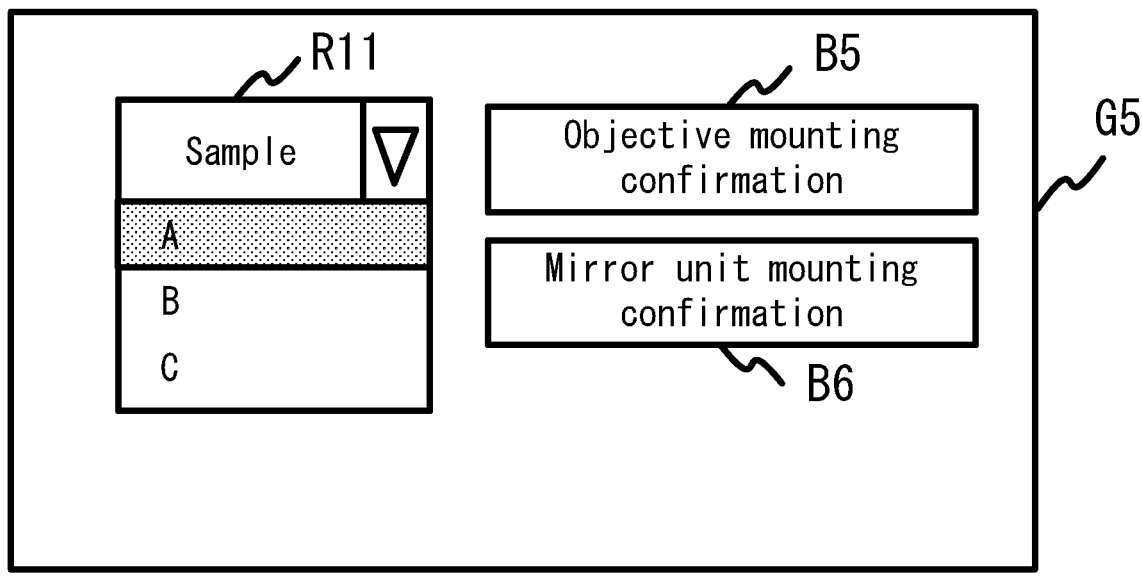
F I G. 3 3

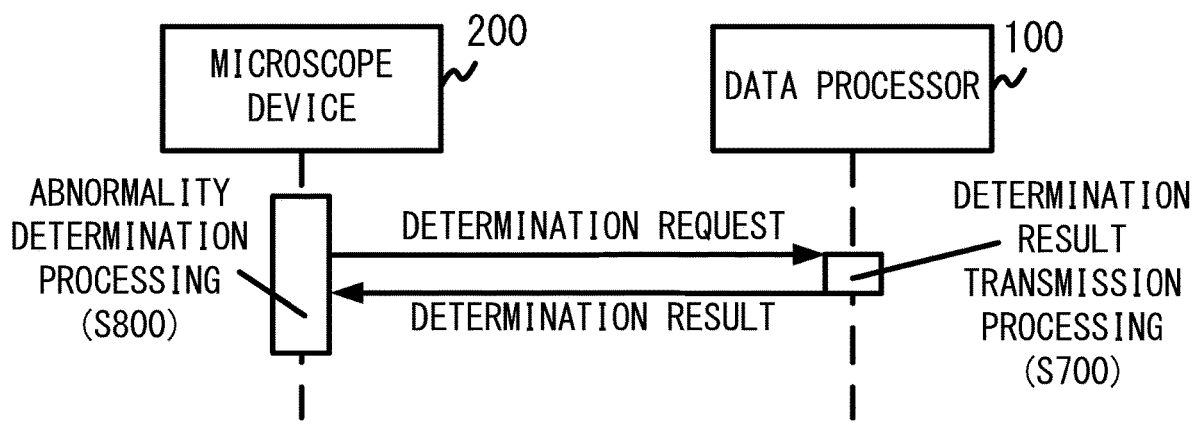
F I G. 3 4

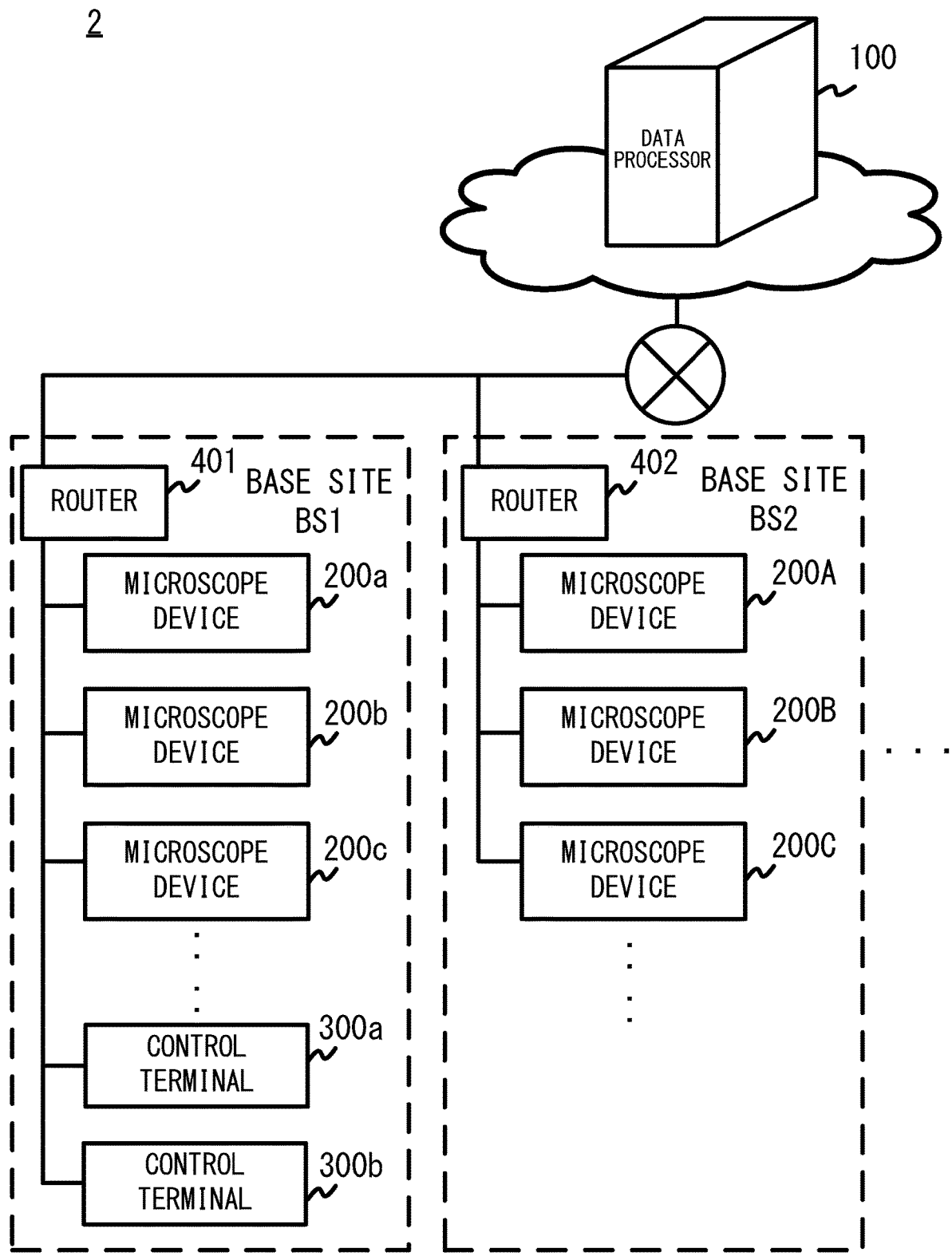
F I G. 3 7

F6c — SAMPLE C, MIRROR UNIT BF
F6b — SAMPLE B, MIRROR UNIT BF

SAMPLE A, MIRROR UNIT BF

| OBJECTIVE | | FRAME RATE | | CONTRAST | |
|---|---|---|---|---|---|
| TYPE | MAGNIFICATION | MIN VALUE | MAX VALUE | MIN VALUE | MAX VALUE |
| MPLANFLNBD | 5× | 33 | 50 | 11000 | 15000 |
| MPLANFLNBD | 10× | 30 | 47 | 10000 | 16000 |
| MPLANFLNBD | 20× | 30 | 45 | 8000 | 10000 |
| MPLANFLNBD | 50× | 25 | 40 | 5000 | 7500 |
| MPLANFLNBD | 100× | 25 | 38 | 1000 | 2500 |
| MPLANFLNBD | 150× | 25 | 35 | 300 | 700 |

F6a

F6f — SAMPLE C, MIRROR UNIT DF
F6e — SAMPLE B, MIRROR UNIT DF

SAMPLE A, MIRROR UNIT DF

| OBJECTIVE | | FRAME RATE | | CONTRAST | |
|---|---|---|---|---|---|
| TYPE | MAGNIFICATION | MIN VALUE | MAX VALUE | MIN VALUE | MAX VALUE |
| MPLANFLNBD | 5× | . . . | . . . . | . . . . | . . . . |
| MPLANFLNBD | 10× | . . . | . . . . | . . . . | . . . . |
| MPLANFLNBD | 20× | . . . | . . . . | . . . . | . . . . |
| MPLANFLNBD | 50× | . . . | . . . . | . . . . | . . . . |
| MPLANFLNBD | 100× | . . . | . . . . | . . . . | . . . . |
| MPLANFLNBD | 150× | . . . | . . . . | . . . . | . . . . |

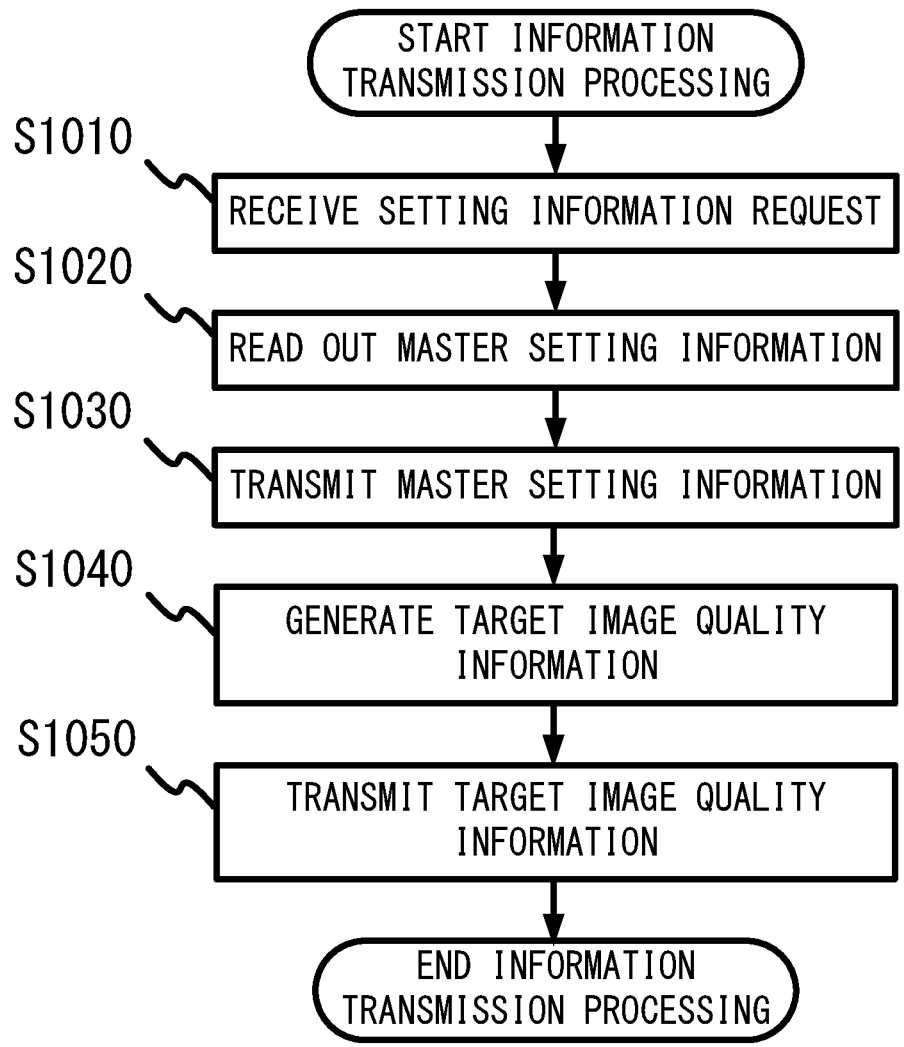
F I G. 4 2

| | DIC | | |
| --- | --- | --- | --- |
| | DF | | |
| | BF | | |
| OBJECTIVE MOUNTING POSITION | FRAME RATE | CONTRAST | |
| 1 | 41.5 | 13000 | |
| 2 | 38.5 | 13000 | |
| 3 | 37.5 | 9000 | |
| 4 | 32.5 | 6250 | |
| 5 | 31.5 | 1750 | |
| 6 | 30 | 500 | |

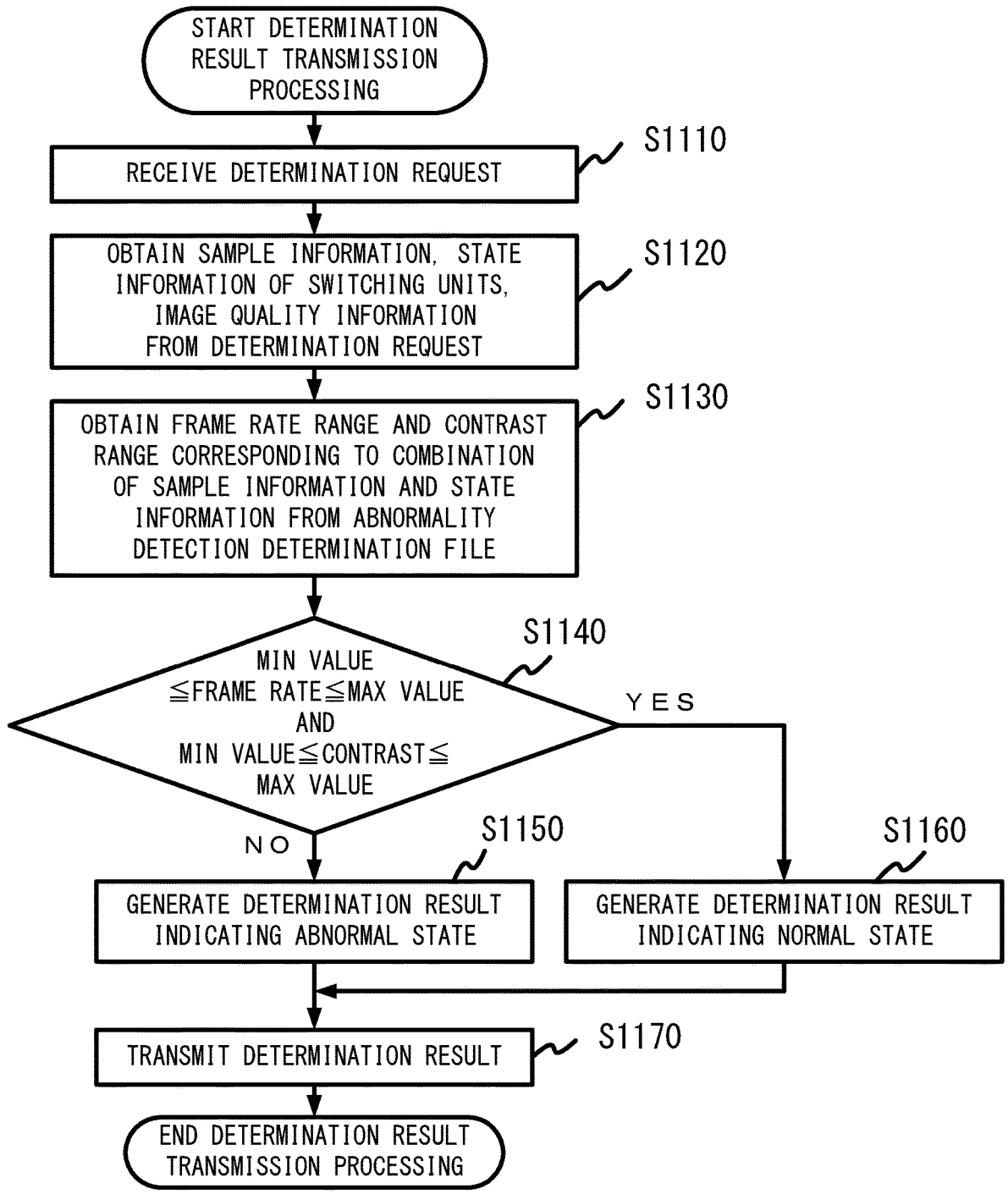
F I G. 4 5

MICROSCOPE DEVICE, DATA PROCESSOR, AND SYSTEM

CROSS REFERENCE TO RELATED APPLICATIONS

This application is based upon and claims the benefit of priority from prior Japanese Patent Application No. 2018-047375, filed Mar. 15, 2018, the entire contents of which are incorporated herein by this reference.

BACKGROUND OF THE INVENTION

Field of the Invention

The disclosure of the present application relates to a microscope device, a data processor, and a system.

Description of the Related Art

Currently, microscope devices are used for various purposes in a wide range of fields of industry (See Japanese Laid-open Patent Publication No. 2001-057171 and Japanese Laid-open Patent Publication No. 2011-059179 as an example). For example, microscope devices have been introduced, as testing devices, into testing facilities including clinical laboratory organizations for examining specimens obtained from living subjects, and inspecting factories for inspecting electronic components such as semiconductors.

In many of the above-described testing facilities, multiple microscope devices having the same structure are installed. By using these microscope devices with the same setting, a large amount of specimens can be inspected with a certain level of quality in a testing facility.

SUMMARY OF THE INVENTION

The microscope device according to one mode of the present invention is a microscope device that is used in multiple types of microscopy and is connected to a network, and the microscope device includes a communication unit that receives master setting information from a data processor by communicating with the data processor over the network, the master setting information including multiple pieces of customizing setting information that correspond to the multiple types of microscopy, and a control unit that registers or updates own-device-setting information of the microscope device in accordance with the master setting information received by the communication unit.

The microscope device according to another mode of the present invention is a microscope device that is used in multiple types of microscopy and is connected to a network, and the microscope device includes a receiving unit that receives an operation of a user of the microscope device, a control unit that generates own-device-setting information including multiple pieces of customizing setting information that correspond to the multiple types of microscopy based on the operation received by the receiving unit, and a communication unit that transmits the own-device-setting information generated by the control unit to a data processor as master setting information by communicating with the data processor over the network.

The data processor according to one mode of the present invention is a data processor that communicates with multiple microscope devices used in multiple types of microscopy over a network, and the data processor includes a storage unit that stores master setting information, the master setting information including multiple pieces of customizing setting information that correspond to the multiple types of microscopy, and a communication unit that transmits, in response to a setting information request from each of the multiple microscope devices, the master setting information to a microscope device, which is a transmission source of the setting information request, by communicating with each of the multiple microscope devices over the network.

The system according to one mode of the present invention includes the microscope device according to the above-described one mode and the data processor according to the above-described one mode.

BRIEF DESCRIPTION OF THE DRAWINGS

The present invention will be more apparent from the following detailed description when the accompanying drawings are referenced.

FIG. 3 is a diagram illustrating, as an example, a configuration of a microscope device 200.

FIG. 5 is a diagram illustrating, as an example, a configuration of a mirror slider 13.

FIG. 7 is a diagram illustrating, as an example, a configuration of a computer 30.

FIG. 8 is a diagram illustrating, as an example, a configuration of a data processor 100.

FIG. 9 is a sequence diagram illustrating, as an example, processing that the system 1 carries out.

FIG. 15 is a diagram illustrating an example of a main screen.

FIG. 18 is a diagram illustrating, as an example, a mount setting information file.

FIG. 20 is a diagram illustrating, as an example, a customizing setting information file.

FIG. 22 is a diagram illustrating, as an example, a main screen G1a.

FIG. 23 is a diagram illustrating an example of a device state file.

FIG. 24 is a diagram illustrating an example of an abnormality detection determination file.

FIG. 25 is a diagram illustrating an example of a log file.

FIG. 27 is an example of a flowchart of second setting preparation processing.

FIG. 29 is a sequence diagram illustrating, as an example, another processing carried out by the system 1.

FIG. 33 is a diagram illustrating, as an example, a mounting confirmation screen.

FIG. 34 is a sequence diagram illustrating, as an example, the other processing carried out by the system 1.

FIG. 37 is a diagram illustrating, as an example, a configuration of a system 2 according to the second embodiment.

FIG. 39 is a diagram illustrating another example of an abnormality detection determination file.

FIG. 42 is an example of a flowchart of information transmission processing.

FIG. 44 is a diagram illustrating an example of a target image quality information file.

FIG. 45 is another example of a flowchart of determination result transmission processing.

DESCRIPTION OF THE EMBODIMENTS

In order to use multiple microscope devices with the same setting, the same setting information needs to be input to and registered in each of the multiple microscope devices in advance. In particular, due to an issue unique to microscope devices in which setting is different for different types of microscopy, information similar for each of the different types of microscopy needs to be repeatedly input to each of the microscope devices as setting information. In addition, when an inspection line established in a central testing facility (hereinafter referred to as the central base site) is introduced into other domestic or international base sites (hereinafter referred simply to as the base site(s)), for example, the same setting information needs to be input to each of the multiple microscope devices located in different places.

Such operations have been carried out by manual effort, but the manual effort is not desirable in aspects of cost and quality. For example, when the operations are collectively carried out by an operator or a small group of operators, a large amount of operations will be assigned per operator and each operator will have too much workload. When the operations are collectively carried out by a large group of operators, the workload per operator will be reduced but the costs will be increased. When the user of each of the microscope devices separately carries out the operations, erroneous inputs of setting information is more likely to occur.

In consideration of the above cases, descriptions of the embodiments of the present invention are provided below.

First Embodiment

Figure 1:
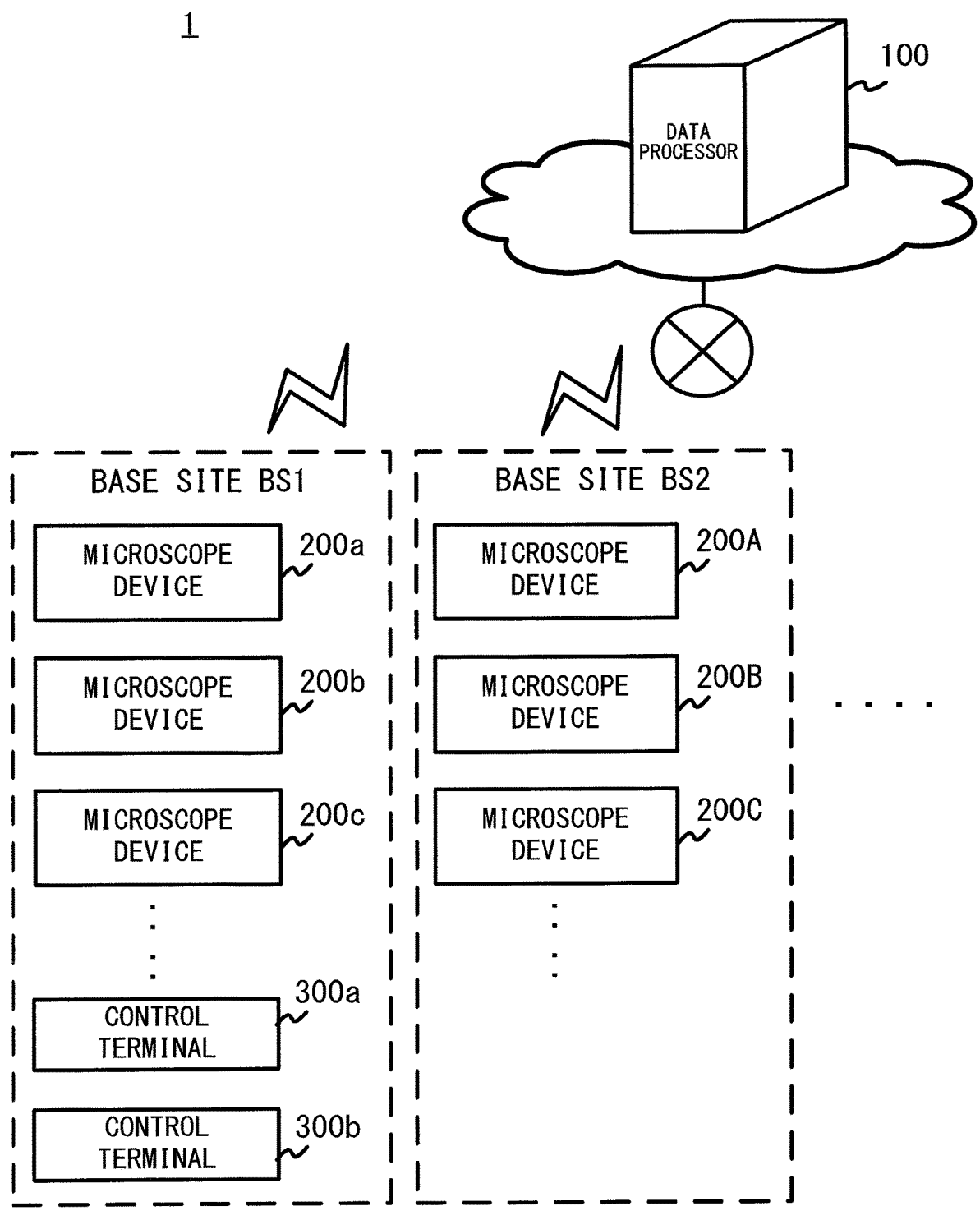
FIG. 1 is a diagram illustrating, as an example, a configuration of a system 1 according to the first embodiment.
Figure 2:
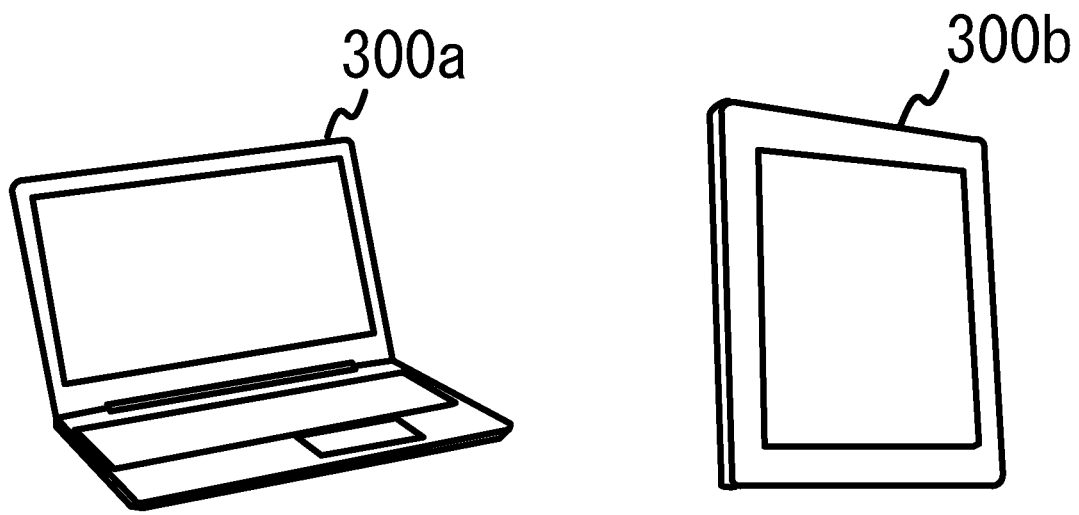
FIG. 2 is a diagram illustrating, as an example, a control terminal 300a and a control terminal 300b.
Figure 4:
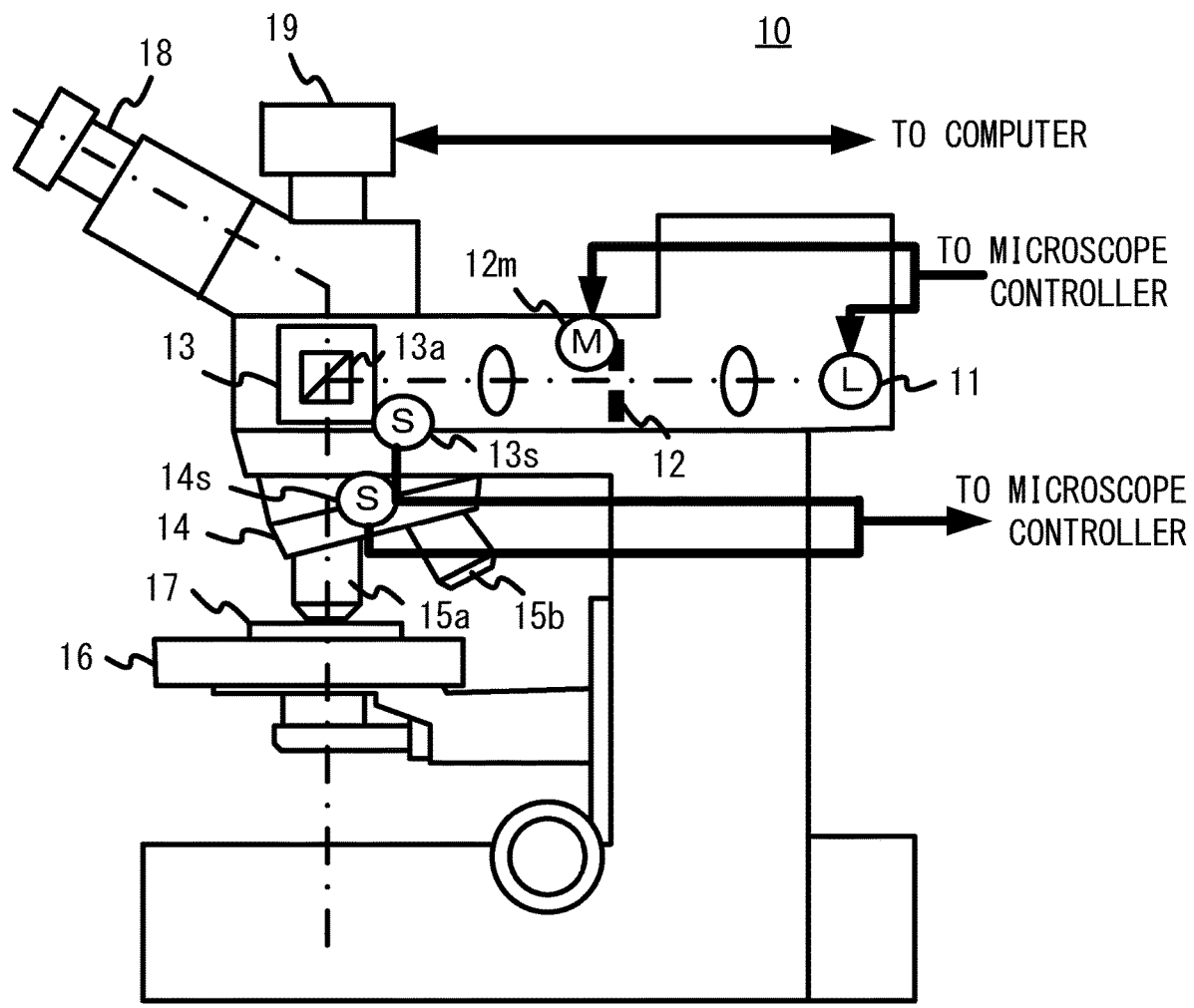
FIG. 4 is a diagram illustrating, as an example, a configuration of a microscope body 10.
Figure 6:
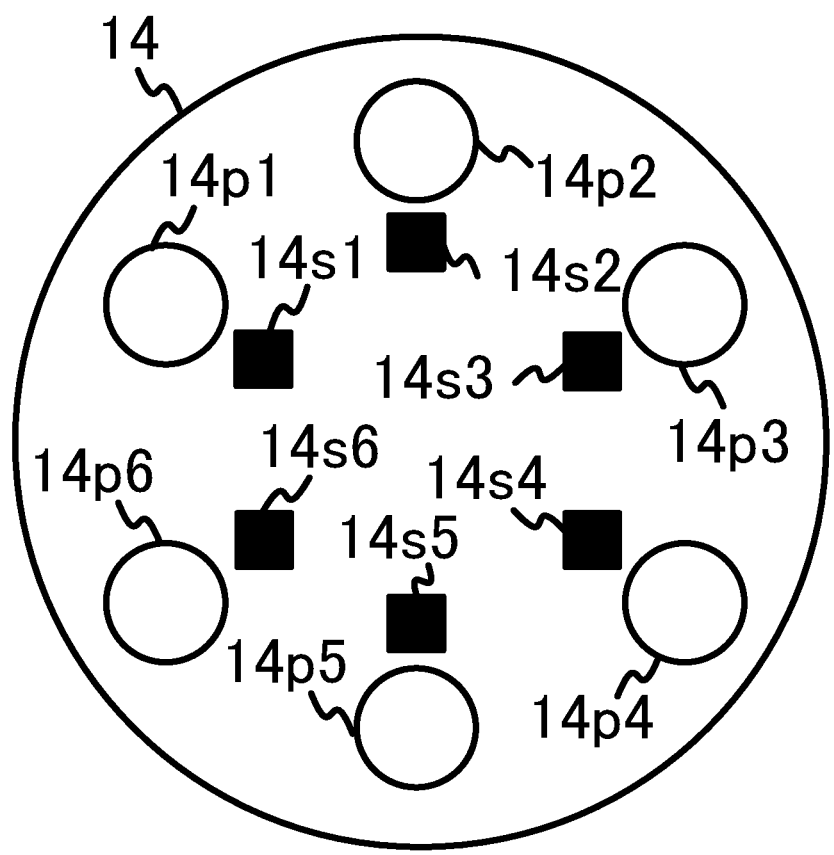
FIG. 6 is a diagram illustrating, as an example, a configuration of a nosepiece 14.

FIG. 1 is a diagram illustrating, as an example, a configuration of a system 1 according to the first embodiment. FIG. 2 is a diagram illustrating, as an example, a control terminal 300a and a control terminal 300b. FIG. 3 is a diagram illustrating, as an example, a configuration of a microscope device 200. FIG. 4 is a diagram illustrating, as an example, a configuration of a microscope body 10. FIG. 5 is a diagram illustrating, as an example, a configuration of a mirror slider 13. FIG. 6 is a diagram illustrating, as an example, a configuration of a nosepiece 14. FIG. 7 is a diagram illustrating, as an example, a configuration of a computer 30. FIG. 8 is a diagram illustrating, as an example, a configuration of a data processor 100. The configuration of the system 1 is explained below with reference to FIG. 1 to FIG. 8.

As illustrated in FIG. 1, the system 1 includes the data processor 100 and multiple microscope devices (microscope devices 200a, 200b, 200c, 200A, 200B, 200C . . . ). It is preferable that the system 1 further includes one or more control terminals (control terminal 300a, 300b).

It should be noted that in this specification, when a description of a microscope device does not apply only to a specific one of the multiple microscope devices but is also applicable to any one of the other microscope devices, the microscope device is collectively denoted as the microscope device 200. Similarly, when a description of a control terminal does not apply only to a specific one of the one or more control terminals but is also applicable to any one of the other control terminals, the control terminal is collectively denoted as the control terminal 300.

Each of the multiple microscope devices 200 and the data processor 100 are connected to one another over a network. The multiple microscope devices 200 may be divided into groups to be installed in multiple base sites (base sites BS1, BS2 . . . ). FIG. 1 illustrates an example in which multiple microscope device 200 are installed in multiple base sites. Here, all of the multiple microscope devices 200 may be installed in a single base site. In addition, FIG. 1 illustrates an example in which the data processor 100 is a cloud server installed in a data center etc. Here, the data processor 100 may be installed within the base site in which the microscope device 200 is installed as long as the data processor 100 is communicable with the microscope device 200 over a network.

One or more control terminals 300 may be installed in a single base site or may be installed in multiple base sites. As illustrated in FIG. 2, the one or more control terminals 300 may include a mobile terminal such as a control terminal 300a that is a laptop computer or a control terminal 300b that is a tablet computer. As a result, the one or more control terminals 300 can be used in any places that are not limited to a specific base site such as the head office of a company or a factory.

The microscope device 200 is a microscope device that is used for multiple types of microscopy and is connected to a network. As illustrated in FIG. 3, the microscope device 200 includes a microscope body 10, a microscope controller 20, a computer 30, and a communication device 40. It is preferable that the microscope device 200 further include a display device 50 and an input device 60. The microscope device 200 obtains a microscopic image by means of the microscope controller 20 controlling the microscope body 10 to drive in accordance with a command from the computer 30. FIG. 3 illustrates an example in which the microscope body 10 and the microscope controller 20 are connected to one another by a cable. However, the microscope body 10 and the microscope controller 20 may be integrated with each other. That is, it may be a single devices.

As illustrated in FIG. 4, the microscope body 10 includes a light source 11, an aperture stop 12, a mirror slider 13, a position sensor 13s, a nosepiece 14, a position sensor 14s, multiple objectives (objectives 15a, 15b . . . ), a stage 16 to place a sample 17, an eyepiece 18, and an imaging device 19.

The light source 11 is a lamp light source such as a mercury lamp and a xenon lamp. The light source 11 may be an LED light source. When the microscope device 200 is a scanning microscope, the light source 11 may be a laser source. The light source 11 is one of motorized units placed on the optical path of the microscope device 200.

The aperture stop 12 is one of the motorized units placed on the optical path of the microscope device 200 and includes a motor 12m to change the aperture diameter of the aperture stop 12. The aperture diameter of the aperture stop 12 is controlled by the microscope controller 20.

The mirror slider 13 is a switching unit having multiple mounting positions to mount optical devices. The optical devices mounted on the mounting positions of the mirror slider 13 are mirror units. The mirror slider 13 can mount multiple mirror units. The mirror slider 13 places, on the optical path of the microscope device 200, a mirror unit selected from among the multiple mirror units mounted on the mirror slider 13. The switching of the mirror units may be motorizedly or manually operated. FIG. 4 illustrates an example in which a BF mirror unit 13a is placed on the optical path.

The mirror slider 13 includes one or more position sensors 13s for detecting a state of the mirror slider 13. The position sensor 13a is a Hall effect device as an example. More specifically, the mirror slider 13 includes multiple mounting positions (mounting positions 13p1, 13p2, 13p3) for mounting optical devices and multiple position sensors (position sensors 13s1, 13s2, 13s3) as illustrated in FIG. 5.

A BF mirror unit 13a used for bright field microscopy (hereinafter denoted as BF), a DF mirror unit 13b used for dark field microscopy (hereinafter denoted as DF), and a DIC mirror unit 13c used for differential interference contrast microscopy (hereinafter denoted as DIC) etc., are mounted on the mounting positions of the mirror slider 13. The detection results of the multiple position sensors 13s are output to the microscope controller 20. As a result, the microscope controller 20 and the computer 30 can obtain information indicating a state of the mirror slider 13, or information indicating which mounting position is placed on the optical path, i.e., information indicating which type of microscopy is in an available state.

The nosepiece 14 is a switching unit having multiple mounting positions for mounting the optical devices. The optical devices mounted on the mounting positions of the nosepiece 14 are microscope objectives. Multiple objectives can be mounted on the nosepiece 14. The nosepiece 14 places an objective selected from among the multiple objectives mounted on the nosepiece 14 on the optical path of the microscope device 200. The switching of the objectives may be motorizedly or manually operated. FIG. 4 illustrates an example in which an objective 15a is placed on the optical path.

The nosepiece 14 includes one or more position sensors 14s for detecting a state of the nosepiece 14. The position sensor 14a is a Hall effect device as an example. More specifically, the nosepiece 14 includes multiple mounting positions (mounting positions 14p1, 14p2, 14p3, 14p4, 14p5, 14p6) for mounting optical devices and multiple position sensors (position sensors 14s1, 14s2, 14s3, 14s4, 14s5, 14s6) as illustrated in FIG. 6.

For example, an objective 15a of 5× magnification, an objective 15b of 10× magnification, an objective of 20× magnification, an objective of 50× magnification, an objective of 100× magnification, and an objective of 150× magnification are mounted on the mounting positions of the nosepiece 14. The detection results of the multiple position sensors 14s are output to the microscope controller 20. As a result, the microscope controller 20 and the computer 30 can obtain information indicating a state of the nosepiece 14, or information indicating which mounting position is placed on the optical path, i.e., information indicating which objective (with what magnification) is in an available state.

The stage 16 may be an XY stage movable in a direction orthogonal to the optical axis direction of the objective placed on the optical path. The stage 16 may also be a Z stage movable in the optical axis direction of the objective. The stage 16 may also be a rotary stage rotatable around the optical axis of the objective. In addition, the stage 16 does not have to be any one of the XY stage, the Z stage and the rotary stage, but may include two or more of these stages. The stage 16 may be a motorized stage operated under the control of the microscope controller 20.

The sample 17 is not limited in particular. The sample 17 may be a specimen obtained from a living body or may be an electronic component etc. The eyepiece 18 is not always necessary, but the microscope body 10 needs to have at least one of the eyepiece 18 and the imaging device 19.

The imaging device 19 is a digital camera including image sensors such as CCD (Charge Coupled Device) and CMOS (Complementary Metal Oxide Semiconductor). The imaging device 19 is placed on the optical path of the microscope device 200 and performs autoexposure control. The imaging device 19 obtains a microscopic image by imaging the sample 17 and generating a microscopic image, which is an image of the sample 17. The microscopic image is output from the imaging device 19 to the computer 30.

The computer 30 is a standard computer as an example. As illustrated in FIG. 7, the computer 30 includes a processor 31, a memory 32, an I/O interface 33, a storage 34, a portable storage medium driver 35 into which a portable storage medium 38 is inserted, and a NW interface 36. These components are connected to each other by a bus 37.

The processor 31 includes a CPU (Central Processing Unit) as an example and performs programmed processing by executing a program. The processor 31 is a control unit of the microscope device 200. The memory 32 includes a RAM (Random Access Memory) as an example and stores programs or data stored in the storage 34 or the portable storage medium 38 at the time of executing programs.

The I/O interface 33 includes a USB (Universal Serial Bus) interface circuit as an example. The communication device 40, the display device 50, the input device 60, which are described later, are connected to the I/O interface 33. The storage 34 includes a hard disk or a flash memory as an example and is used mainly for storing various data and programs.

The portable storage medium driver 35 takes in the portable storage medium 38 such as an optical disk and a CompactFlash™. The portable storage medium 38 functions as an auxiliary of the storage 34. Each of the memory 32, the storage 34, and the portable storage medium 38 is an example of a non-transitory computer-readable storage medium that stores programs. The NW interface 36 includes a LAN (Local Area Network) card as an example.

The configuration illustrated in FIG. 7 is merely an example of a hardware configuration of the computer 30 and the configuration of the computer 30 is not limited to this configuration. The computer 30 does not have to be a general-purpose device, but may be a special-purpose device.

The communication device 40 includes an LTE (Long Term Evolution) USB dongle as an example. The communication device 40 is a communication unit that communicates with the data processor 100 over a network.

The display device 50 includes a liquid-crystal display, an organic EL display (OLED), a CRT (Cathode Ray Tube) display etc., for example. The display device 50 displays the microscopic image obtained by the imaging device 19.

The input device 60 is a device that allows a user to directly operate the microscope device 200 and is a receiving unit that receives operations from the user of the microscope device 200. The input device 60 is, for example, a keyboard, a mouse, a joystick, a touch panel, etc.

The data processor 100 is a data processor that communicates with multiple microscope devices 200 used in multiples types of microscopy over a network. The data processor 100 is a standard computer as an example. As illustrated in FIG. 8, the data processor 100 includes a processor 101, a memory 102, an I/O interface 103, a storage 104, a portable storage medium driver 105 into which a portable storage medium 108 is inserted, and a NW interface 106. These components are connected to each other by a bus 107.

The processor 101 includes a CPU as an example and performs programmed processing by executing a program. The processor 101 is a control unit of the data processor 100. The memory 102 includes a RAM as an example and stores programs or data stored in the storage 104 or the portable storage medium 108 at the time of executing programs.

The I/O interface 33 includes a USB interface circuit as an example. The I/O interface 103 is connected to a display device and an input device, which are not illustrated in the drawing. The storage 104 includes a hard disk or a flash memory as an example and is used mainly for storing various data and programs. The storage 104 is a storage unit that stores master setting information, which is described later.

The portable storage medium driver 105 takes in the portable storage medium 108 such as an optical disk and a CompactFlash™. The portable storage medium 108 functions as an auxiliary of the storage 104. Each of the memory 102, the storage 104, and the portable storage medium 108 is an example of a non-transitory computer-readable storage medium that stores programs.

The NW interface 106 includes a LAN card as an example. The NW interface 106 is a communication unit that communicates with each of the multiple microscope devices 200 over a network.

The configuration illustrated in FIG. 8 is merely an example of a hardware configuration of the data processor 100 and the configuration of the data processor 100 is not limited to this configuration. The data processor 100 does not have to be a general-purpose device, but may be a special-purpose device.

In the system 1 with a configuration described above, various processing is carried out when the microscope device 200 and the data processor 100 communicate with each other. With reference to FIG. 9 to FIG. 25, processing that the system 1 carries out at first to allow the multiple microscope devices 200 to conduct inspections with a certain level of quality is described.

Figure 10:
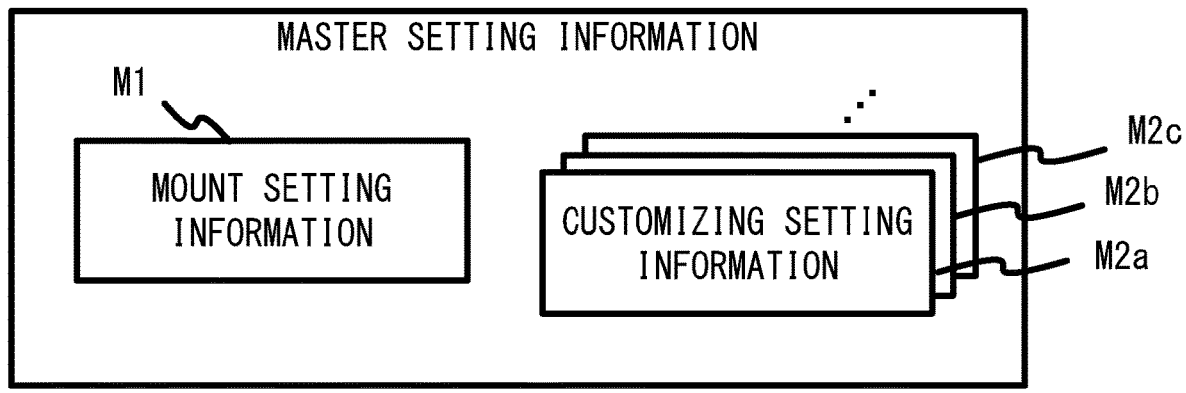
FIG. 10 is a diagram for explaining master setting information.
Figure 11:
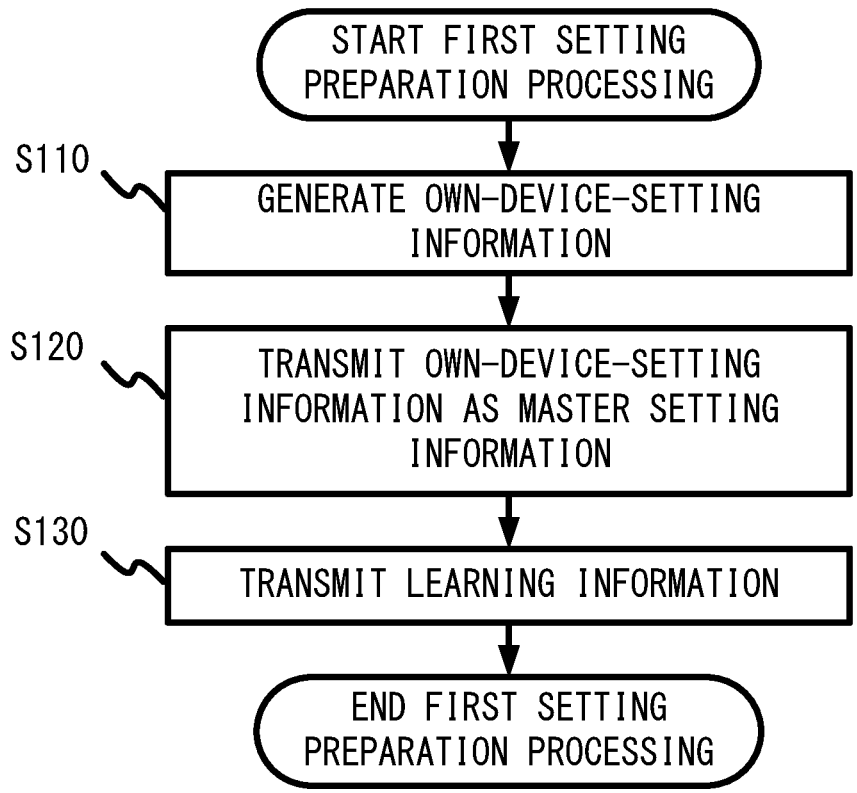
FIG. 11 is an example of a flowchart of first setting preparation processing.
Figure 12:
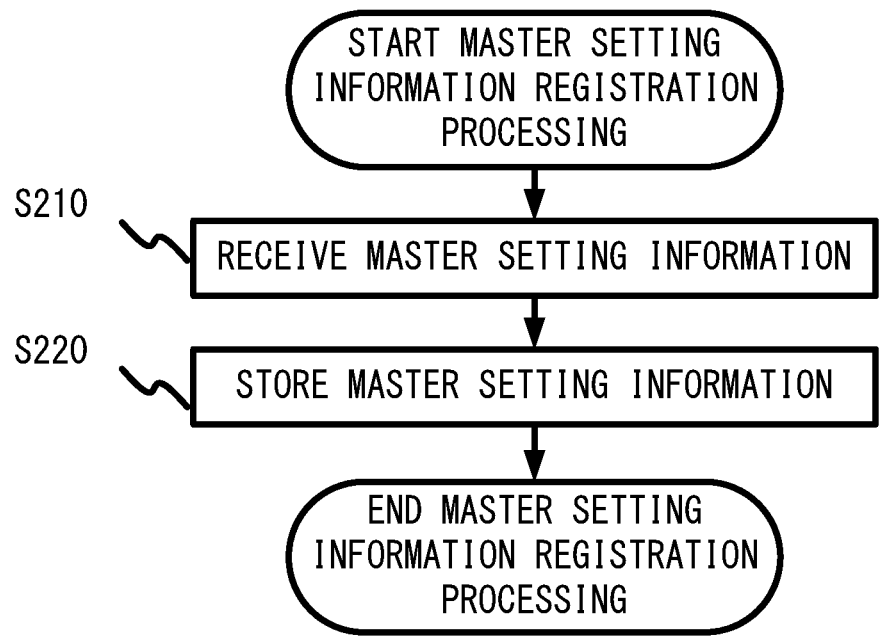
FIG. 12 is an example of a flowchart of master setting information registration processing.
Figure 13:
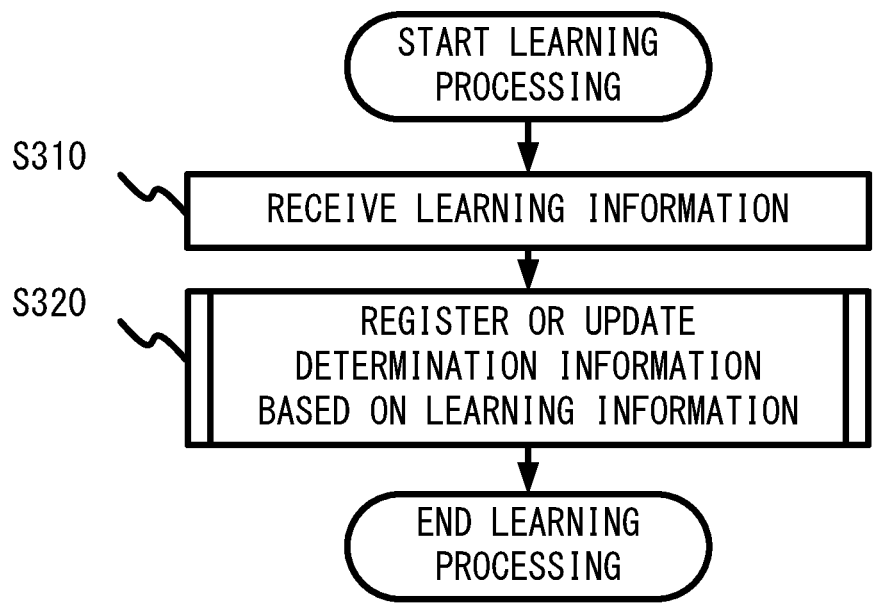
FIG. 13 is an example of a flowchart of learning processing.
Figure 14:
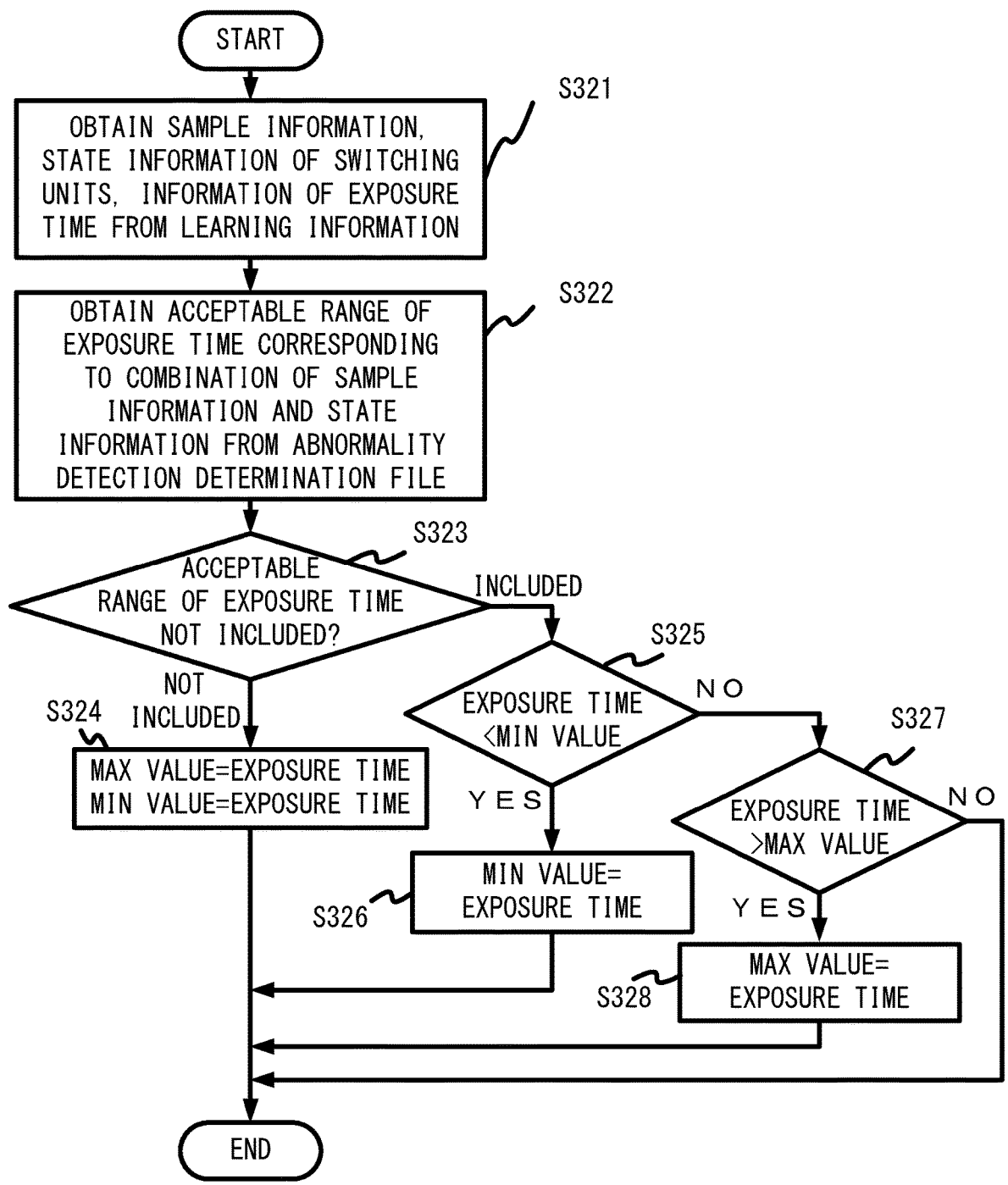
FIG. 14 is an example of a flowchart of determination information registration/update processing.
Figure 16:
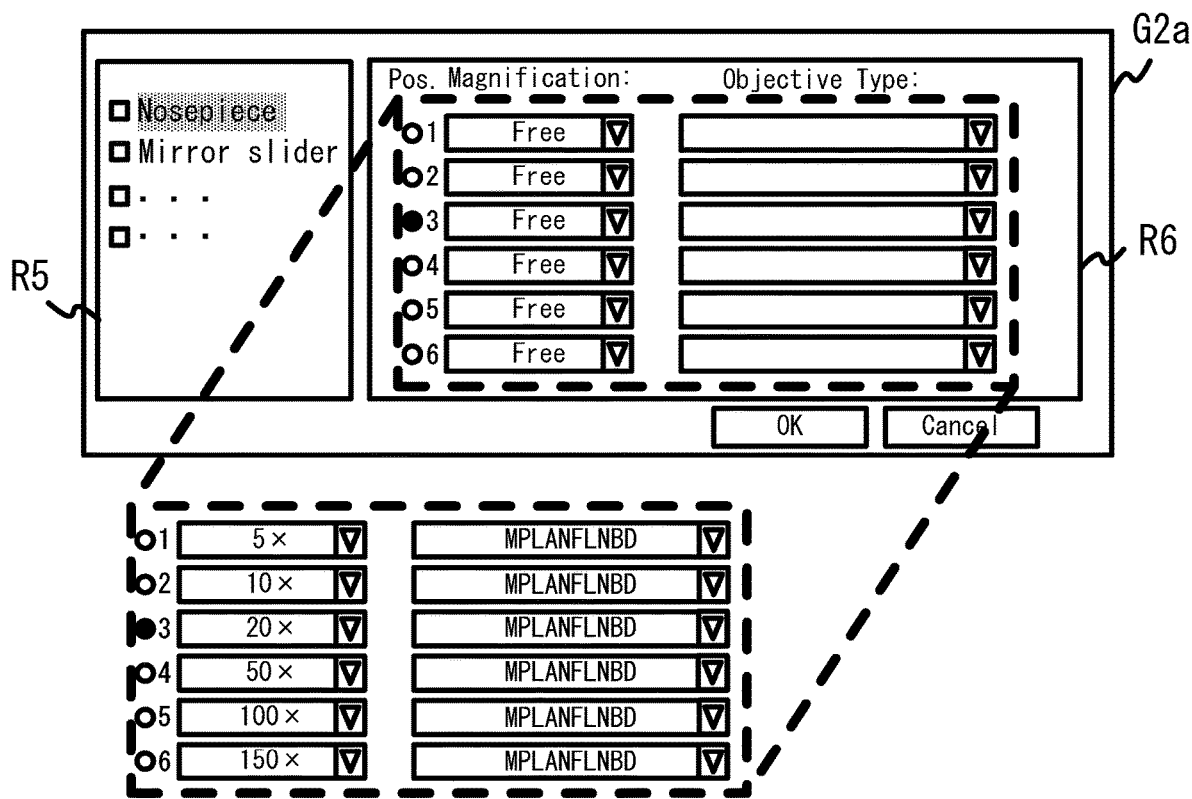
FIG. 16 is a diagram illustrating, as an example, a mount setting information registration screen.
Figure 17:
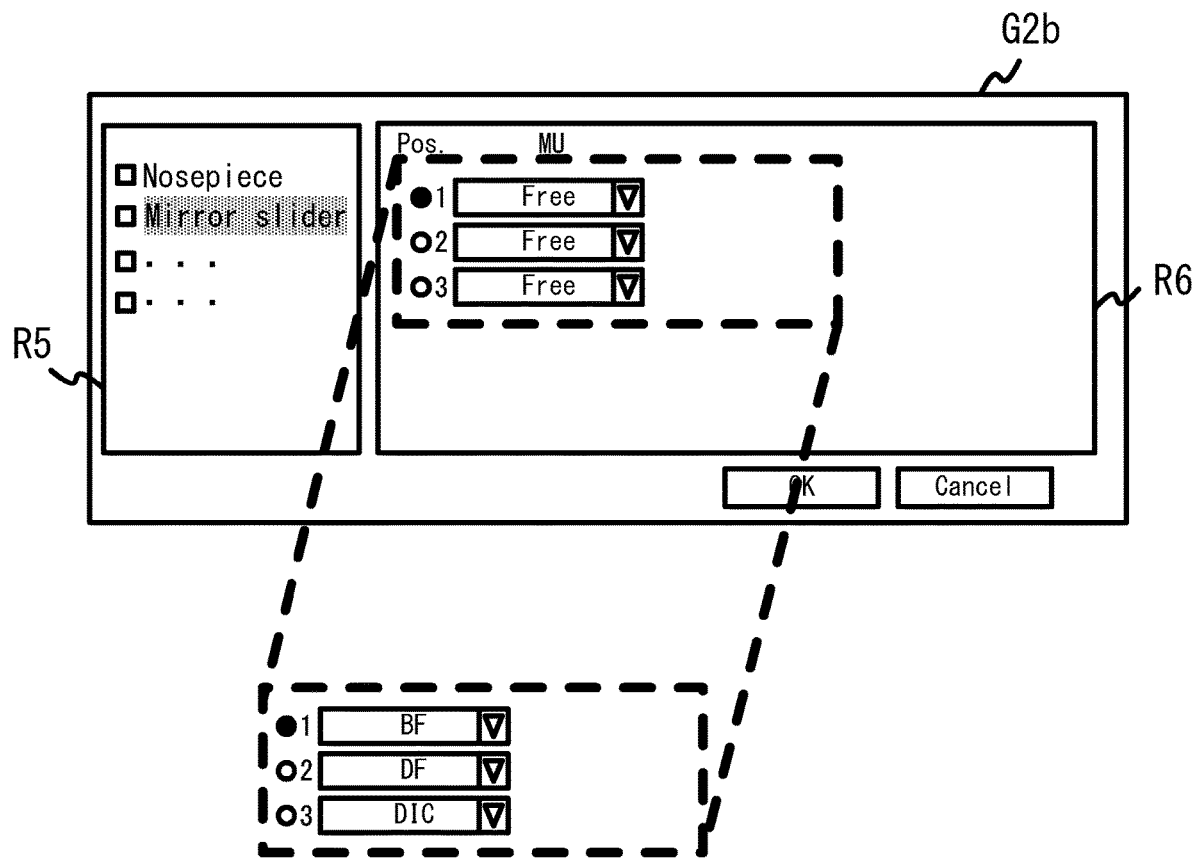
FIG. 17 is another diagram illustrating, as an example, a mount setting information registration screen.
Figure 19:
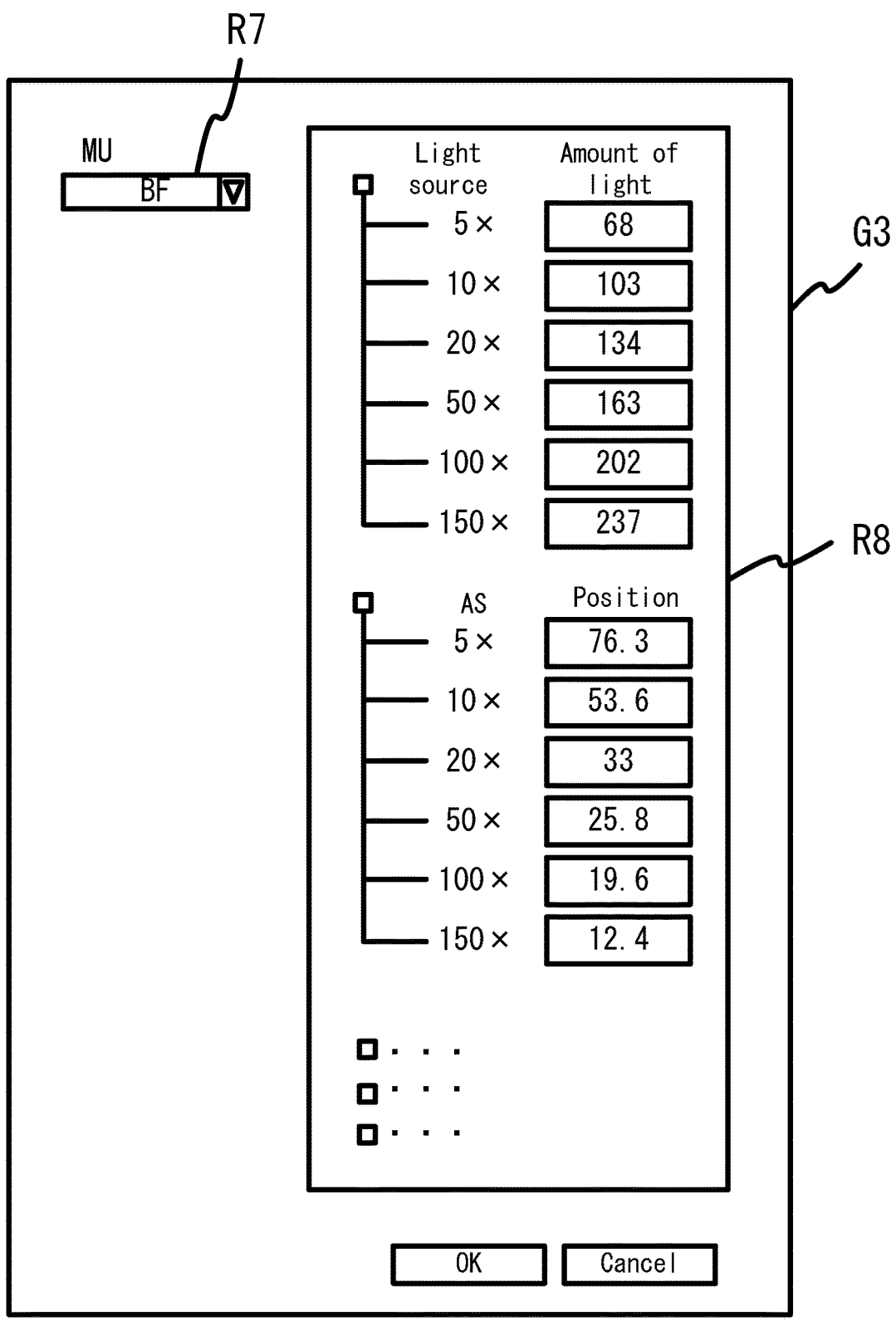
FIG. 19 is a diagram illustrating, as an example, a customizing setting information registration screen.
Figure 21:
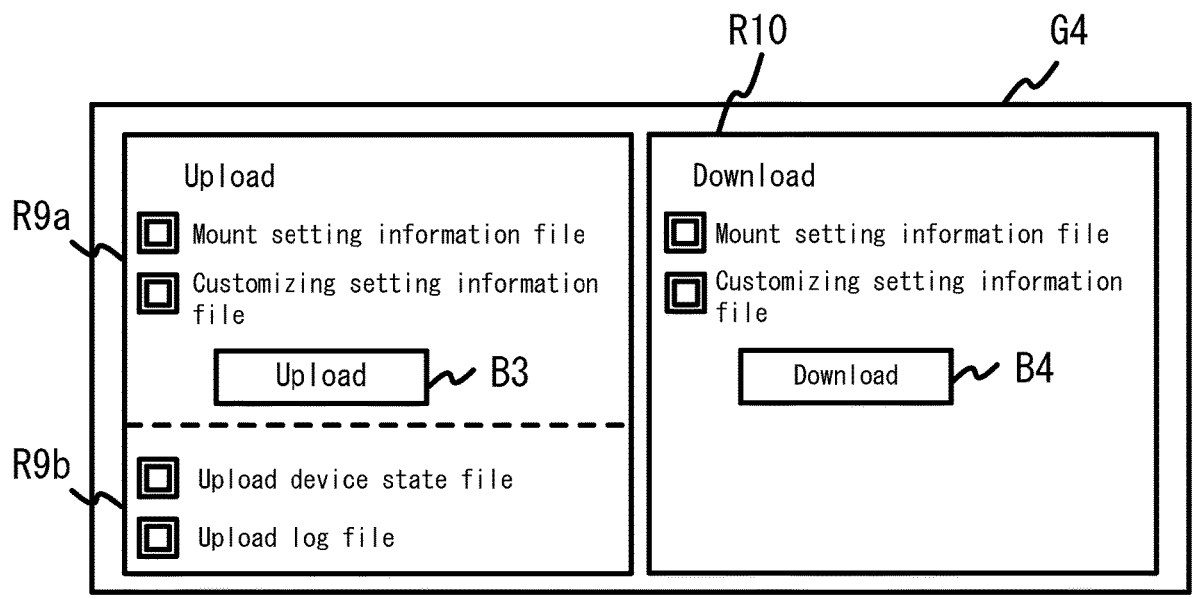
FIG. 21 is a diagram illustrating, as an example, a transmission file setting screen.
Figure 22:
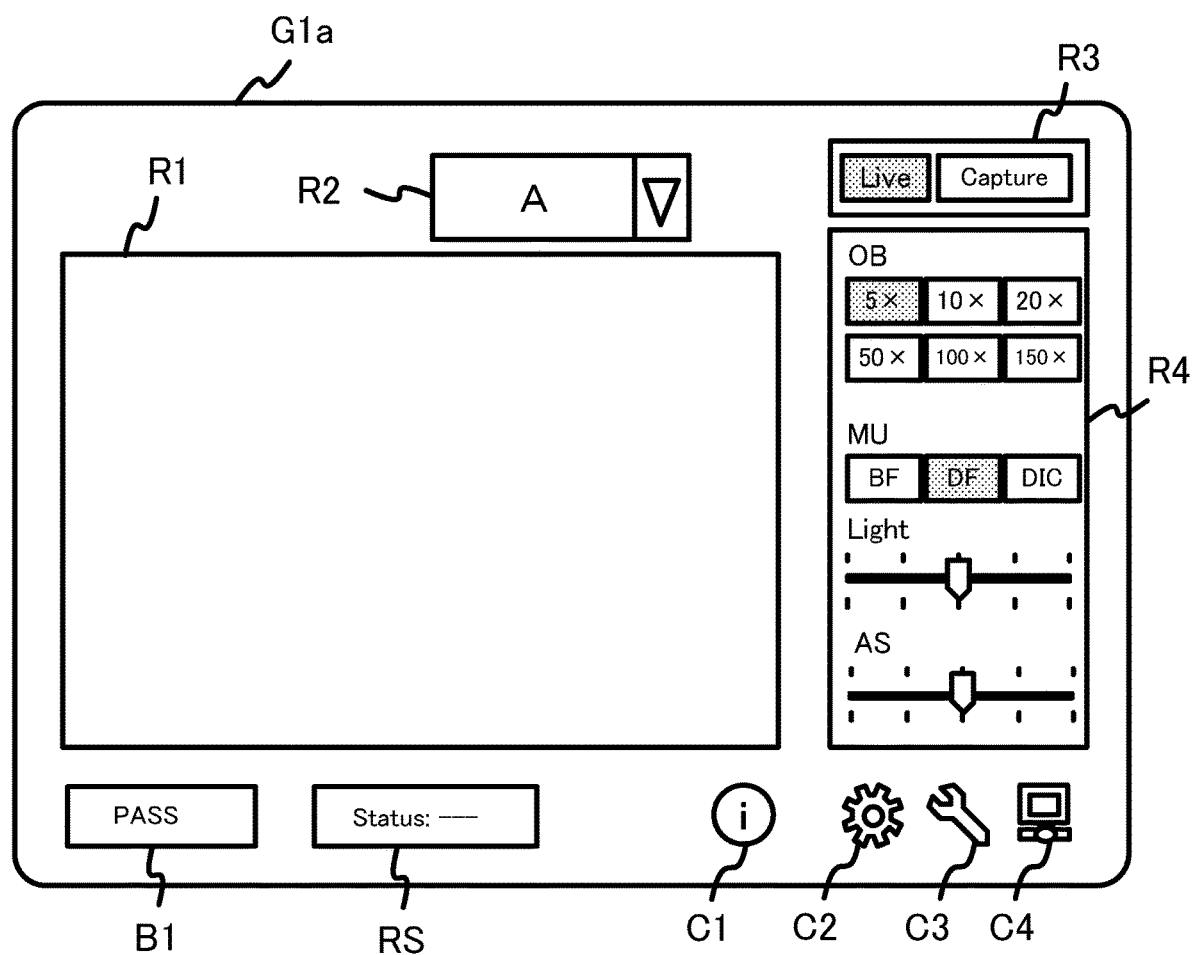

FIG. 9 is a sequence diagram illustrating, as an example, processing that the system 1 carries out. FIG. 10 is a diagram for explaining master setting information. FIG. 11 is an example of a flowchart of the first setting preparation processing. FIG. 12 is an example of a flowchart of the master setting information registration processing. FIG. 13 is an example of a flowchart of the learning processing. FIG. 14 is an example of a flowchart of the determination information registration/update processing. FIG. 15 is a diagram illustrating, as an example, the main screen. FIG. 16 and FIG. 17 are diagrams illustrating, as an example, a mount setting information registration screen. FIG. 18 is a diagram illustrating an example of a mount setting information file. FIG. 19 is a diagram illustrating, as an example, a customizing setting information registration screen. FIG. 20 is a diagram illustrating an example of a customizing setting information file. FIG. 21 is a diagram illustrating, as an example, a transmission file setting screen. FIG. 22 is another diagram illustrating, as an example, a main screen. FIG. 23 is a diagram illustrating an example of a device state file. FIG. 24 is a diagram illustrating an example of an abnormality detection determination file. FIG. 25 is a diagram illustrating an example of a log file.

The processing carried out by the system 1, which is illustrated in FIG. 9, includes the first setting preparation processing (step S100) carried out by the microscope device 200, the master setting information registration processing (step S200) carried out by the data processor 100, and the learning processing (step S300) carried out multiple times by the data processor 100. At least the master setting information and the learning information are exchanged between the microscope device 200 and the data processor 100. As illustrated in FIG. 10, the master setting information includes mount setting information M1 and multiple pieces of customizing setting information (customizing setting information M2a, M2b, M2c . . . ) corresponding to the multiple types of microscopy. Details of the master setting information, the mount setting information M1, the customizing setting information, and the learning information are described later.

An explanation of the first setting preparation processing is provided below. When the system 1 starts the processing illustrated in FIG. 9, the microscope device 200 carries out the first setting preparation processing (step S100) illustrated in FIG. 11. In the first setting preparation processing, the microscope device 200 generates own-device-setting information (step S110).

In step S110, a screen G1 illustrated in FIG. 15 is displayed on the display device 50 when the processor 31 of the computer 30 executes a prescribed program. Note that the screen G1 is a main screen. A region R1 is a region for displaying a microscopic image. A region R2 is a region that allows a user of the microscope device 200 to select the sample 17 placed on the stage 16. A region R3 is a region indicating whether the microscopic image displayed in the region R1 is a live camera image or a still image. A region R4 is a region indicating a state of the switching unit (the nosepiece 14 and the mirror slider 13) and a state of the motorized units (the light source 11 and the aperture stop 12). A region R4 is a region displaying a state of the microscope device 200. The remaining button (button B1) and icons (icon C1, C2, C3, C4) are described later.

When the user presses the icon C2 by using the input device 60 in step S110, a screen G2a illustrated in FIG. 16 is displayed on the display device 50. Here, the screen G2a is a mount setting information registration screen. A region R5 is a region in which one or more switching units are listed so that a switching unit can be selected. A region R6 is a region for inputting the mount setting information. The mount setting information is information indicating correspondence between the multiple mounting positions in a switching unit and optical devices to be mounted on these multiple mounting positions.

In the region R5, a screen in a state in which "Nosepiece" is selected from among two switching units ("Nosepiece" and "Mirror slider") is the screen G2a illustrated in FIG. 16 and a screen in a state in which "Mirror slider" is selected is the screen G2b illustrated in FIG. 17.

The user inputs magnifications and types of six objectives mounted on six mounting positions in the nosepiece 14 into the region R6 in the screen G2a by using the input device 60. When the user finishes the input and presses an OK button, the processor 31 generates the mount setting information of the nosepiece 14 and stores the information in the storage 34. The file F1a illustrated in FIG. 18 is an example of the mount setting information of the nosepiece 14, which is generated by the processor 31. The file F1a indicates that objectives with different magnifications are mounted on the mounting positions.

The user further inputs the types of three mirror units mounted on three mounting positions in the mirror slider 13 into the region R6 of the screen G2b by using the input device 60. When the user finishes the input and presses the OK button, the processor 31 generates mount setting information of the mirror slider 13 and stores the information in the storage 34. The file F1b illustrated in FIG. 18 is an example of the mount setting information of the mirror slider 13, which is generated by the processor 31. The file F1b indicates that the mirror unit corresponding to different types of microscopy is mounted on the mounting positions.

In step S110, when the user presses the icon C3 by using the input device 60, a screen G3 illustrated in FIG. 19 is displayed on the display device 50. Here, the screen G3 is a customizing setting information registration screen. A region R7 is a region to select a mirror unit from among the mirror units mounted on the mirror slider 13 and is substantially a region to select microscopy. A region R8 is a region for inputting the customizing setting information corresponding to the microscopy selected in the region R7. The customizing setting information is information indicating the settings of motorized units.

The user inputs setting information of motorized units that corresponds to the microscopy selected in the region R7 into the region R8 in the screen G3 by using the input device 60.

More specifically, the setting information of the amount of light output from the light source 11 in a range between 0 and 255 is input for each of the objectives mounted on the nosepiece 14. The setting information of the aperture diameter of the aperture stop 12 (AS position) in a range between 0 and 100 is also input for each of the objectives mounted on the nosepiece 14. Note that these inputs are carried out for each of all types of microscopy that can be selected in the region R7. When the user finishes all of the inputs and presses the OK button, the processor 31 generates multiple pieces of customizing setting information corresponding to the multiple types of microscopy and stores the information in the storage 34. A file F2a illustrated in FIG. 20 is an example of the customizing setting information corresponding to BF, which is generated by the processor 31. A file F2b is an example of the customizing setting information corresponding to DF, which is generated by the processor 31. A file F2c is an example of the customizing setting information corresponding to DIC, which is generated by the processor 31. The files F2a, F2b, and F2c indicate that the settings of motorized units will be changed so that the amount of illumination light irradiating the sample 17 increases in the order corresponding to DF, DIC, and BF.

As described above, in step S110, the processor 31 generates own-device-setting information based on the operations received by the input device 60 and stores the information in the storage 34. Note that the own-device-setting information includes the mount setting information and multiple pieces of customizing setting information corresponding to the multiple types of microscopy.

When generation of the own-device-setting information is finished, the microscope device 200 transmits the own-device-setting information to the data processor 100 as master setting information (step S120).

In step S120, when the user presses the icon C4 in the main screen by using the input device 60, a screen G4 illustrated in FIG. 21 is displayed on the display device 50. Here, the screen G4 is a transmission file setting screen. A region R9a and a region R9b are regions for specifying files to be uploaded from the microscope device 200 to the data processor 100. The file specified in the region R9a is uploaded when the button B3 is pressed. Meanwhile, the file specified in the region R9b is uploaded periodically. A region R10 is a region for specifying a file to be downloaded from the data processor 100 to the microscope device 200. The file specified in the region R10 is downloaded when the button B4 is pressed. Note that details of a device state file and a log file in the region R9b are described later.

In the region R9a in the screen G4, the user specifies, by using the input device 60, that the mount setting file and the customizing setting file are the files to be uploaded. Afterwards, when the user presses the button B3, the communication device 40 transmits the own-device-setting information generated by the processor 31 in step S110 to the data processor 100 as the master setting information.

Note that the master setting information is standard setting information in the system 1. When the multiple microscope devices 200 share the master setting information in the system 1, the multiple microscope devices 200 can conduct inspections with a certain level of quality. When the master setting information is transmitted, the microscope device 200 transmits the learning information to the data processor 100 (step S130) and ends the first setting preparation processing.

In step S130, the user checks the microscopic image displayed in the region R1 in the screen G1a illustrated in FIG. 22 and presses the button B1 by using the input device 60 when the displayed microscopic image is favorable. The user repeats this operation while changing the states of the switching units and the sample 17 in various ways. Note that the screen G1a is a main screen after the mount setting information is generated. The screen G1a is different from the screen G1 in that the state of the nosepiece 14 is indicated by the magnification of the objective and that the state of the mirror slider 13 is indicated by the type of microscopy.

In the microscope device 200, when the state of the switching units is changed, the processor 31 detects the state of the switching units after the change from the outputs from the position sensor 13a and the position sensor 14s. The processor 31 changes the setting of motorized units in accordance with the customizing setting information that corresponds to the type of microscopy to be used. In addition, the processor 31 determines whether the microscopic image is favorable or not based on the operation received by the input device 60. More specifically, when the button B1 is pressed, the processor 31 determines the microscopic image displayed on the display device 50 to be favorable, and the communication device 40 transmits a device state file of the microscope device 200 at that time to the data processor 100 as the learning information.

Note that the device state file is a file indicating the state of the microscope device 200. A file F3 illustrated in FIG. 23 is an example of the device state file. The device state file transmitted as learning information includes at least sample information to specify the sample of which an image was captured by the imaging device 19 ("sample: A" in the file F3), information indicating the exposure time of the imaging device 19 ("exposure time: 20" in the file F3), and information indicating the state of the switching units ("nosepiece position: 3, mirror slider position: 1" in the file F3).

An explanation of the master setting information registration processing is provided below. When the system 1 starts the processing illustrated in FIG. 9 and the microscope device 200 transmits the master setting information, the data processor 100 carries out the master setting information registration processing illustrated in FIG. 12 (step S200).

In the master setting information registration processing, the data processor 100 receives master setting information (step S210). More specifically, the NW interface 106 receives, from the microscope device 200, the master setting information including multiple pieces of customizing setting information that correspond to multiple types of microscopy.

Afterwards, the data processor 100 stores the master setting information (step S220) and ends the master setting information registration processing. More specifically, the storage 104 stores the master setting information received by the NW interface 106. In other words, the storage 104 is a storage unit to store the master setting information in the data processor 100.

An explanation of the learning processing is provided below. When the system 1 starts the processing illustrated in FIG. 9 and the microscope device 200 transmits learning information, the data processor 100 carries out the leaning processing illustrated in FIG. 13 (step S300).

In the learning processing, the data processor 100 receives learning information (step S310). More specifically, the NW interface 106 receives, from the microscope device 200, leaning information including at least sample information to specify a sample of which an image is captured by the imaging device 19, information indicating the exposure time of the imaging device 19, and information indicating the state of switching units.

Afterwards, the data processor 100 registers or updates determination information to determine, based on the learning information, whether the state of the microscope device is in a normal state or in an abnormal state (step S320) and ends the leaning processing. More specifically, the processor 101 registers or updates the determination information by carrying out the determination information registration/update processing illustrated in FIG. 14 based on the learning information.

In the determination information registration/update processing, the processor 101 obtains the sample information, the information of exposure time, and the state information of switching units from the learning information received in step S310 (step S321). The processor 101 reads out an acceptable range of exposure time that corresponds to a combination of the sample information and the state information obtained in step S321 from an abnormality detection determination file (step S322). The abnormality detection determination file is a file including the determination information and is stored in the storage 104.

When the corresponding acceptable range of exposure time is not included in the abnormality detection determination file (step S323, NOT INCLUDED), the processor 101 registers the following information in the abnormality detection determination file by using the exposure time indicated by the exposure time information obtained in step S321 (step S324) and ends the determination information registration/update processing.

Maximum value of acceptable range of exposure time=exposure time

Minimum value of acceptable range of exposure time=exposure time

When the corresponding acceptable range of exposure time is included in the abnormality detection determination file, but the exposure time indicated by the exposure time information obtained in step S321 is less than the minimum value of the acceptable range of the exposure time (step S325, YES), the processor 101 updates the abnormality detection determination file in a manner provided below by using the exposure time (step S326) and ends the determination information registration/update processing.

Minimum value of acceptable range of exposure time=exposure time

When the corresponding acceptable range of exposure time is included in the abnormality detection determination file, but the exposure time indicated by the exposure time information obtained in step S321 exceeds the maximum value of the acceptable range of exposure time (step S327, YES), the processor 101 updates the abnormality detection determination file in a manner provided below by using the exposure time (step S328) and ends the determination information registration/update processing.

Maximum value of acceptable range of exposure time=exposure time

When the corresponding acceptable range of exposure time is included in the abnormality detection determination file and the exposure time indicated by the exposure time information obtained in step S321 is within the acceptable range of exposure time, the processor 101 ends the determination information registration/update processing without updating the abnormality detection file.

Files F4a to F4f illustrated in FIG. 24 are examples of the abnormality detection determination file. Note that FIG. 24 provides an example in which an abnormality detection determination file is generated for each combination of the type of sample and the mirror unit, but the conditions of generation of the abnormality detection determination file are not limited in particular.

As described above, in the system 1, master setting information and determination information can be registered in the data processor 100 that is connected to the multiple microscope devices 200 over a network by carrying out the processing in FIG. 9. Consequently, setting information used in the multiple microscope devices 200 can be managed in an integrated manner. In addition, the acceptable range of exposure time becomes more appropriate as the data processor 100 repeatedly carries out the learning processing in the processing illustrated in FIG. 9, and therefore the determination information can be updated to be more appropriate determination information.

In the above description, an example is provided in which when the button B1 is pressed in the main screen, the microscope device 200 transmits learning information to the data processor 100, and when receiving the learning information, the data processor 100 carries out learning processing. However, when a condition in which the device state file and the log file are periodically uploaded is specified in the transmission file setting screen illustrated in FIG. 21, the data processor 100 specifies a point in time at which the button B1 is pressed from the log file and carries out the leaning processing using the device state file at that point in time as learning information. A file F5 illustrated in FIG. 25 is an example of the log file. FIG. 25 indicates that the button B1 is pressed in the microscope device 200 at a point in time of Jul. 7, 2017, 12:14:40.

Another processing carried out by the system 1 to allow the multiple microscope devices 200 to conduct inspections with a certain level of quality is explained with reference to FIG. 26 to FIG. 28. Note that the processing illustrated in FIG. 26 is carried out after at least master setting information is registered in the data processor 100.

Figure 26:
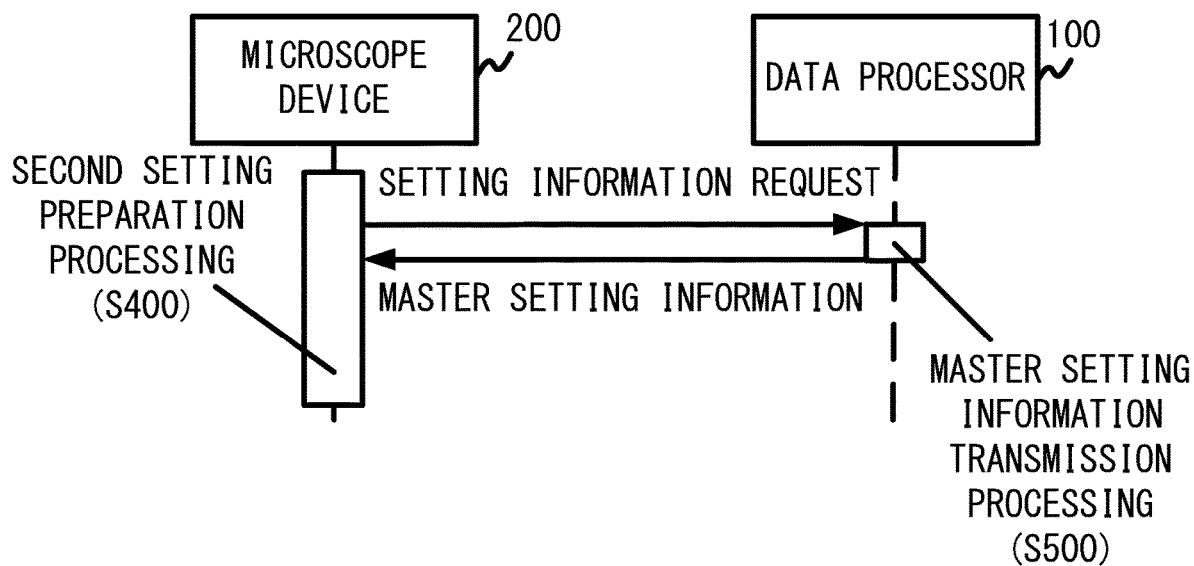
FIG. 26 is a sequence diagram illustrating, as an example, another processing carried out by the system 1.

FIG. 26 is a sequence diagram illustrating, as an example, another processing carried out by the system 1. FIG. 27 is an example of a flowchart of the second setting preparation processing. FIG. 28 is an example of a flowchart of the master setting information transmission processing.

The processing in FIG. 26 carried out by the system 1 includes the second setting preparation processing (step S400) carried out by the microscope device 200 and the master setting information transmission processing (step S500) carried out by the data processor 100. At least a setting information request and master setting information are exchanged between the microscope device 200 and the data processor 100. Note that the processing in FIG. 26 is preferably carried out between the data processor 100 and each of the multiple microscope devices 200 except for the microscope device 200 in which the processing illustrated in FIG. 9 has been carried out.

An explanation of the second setting preparation processing is provided. When the system 1 starts the processing illustrated in FIG. 26, the microscope device 200 carries out the second setting preparation processing illustrated in FIG. 27 (step S400). In the second setting preparation processing, the microscope device 200 requests the data processor 100 to transmit master setting information by transmitting a setting information request to the data processor 100 (step S410).

In step S410, when a user presses the icon C4 in the main screen by using the input device 60, the screen G4 illustrated in FIG. 21 is displayed on the display device 50. The user specifies, in the region R10 in the screen G4, a mount setting file and a customizing setting file to be downloaded by using the input device 60. Afterwards, the user presses the button B4, the communication device 40 transmits a setting information request to the data processor 100.

Next, the microscope device 200 receives master setting information from the data processor 100 (step S420). More specifically, the communication device 40 receives, from the data processor 100, master setting information that includes multiple pieces of customizing setting information that correspond to multiple types of microscopy.

Finally, the microscope device 200 registers the own-device-setting information (step S430) and ends the second setting preparation processing. More specifically, the processor 31 registers the own-device-setting information of the microscope device 200 in accordance with the master setting information received by the communication device 40. Further more specifically, a file including the own-device-setting information that has the same content as the master setting information is generated in the storage 34. Note that when a file including the own-device-setting information has already been generated, content of the file is updated with the master setting information received in step S420.

An explanation of the master setting information transmission processing is provided. When the system 1 starts the processing illustrated in FIG. 26 and the microscope device 200 transmits a setting information request, the data processor 100 carries out the master setting information transmission processing illustrated in FIG. 28 (step S500).

In the master setting information transmission processing, the data processor 100 receives a setting information request (step S510). More specifically, the NW interface 106 receives the setting information request.

Afterwards, the data processor 100 reads out master setting information (step S520), transmits the master setting information to the microscope device 200 (step S530), and ends the master setting information transmission processing. More specifically, in response to a setting information request, the NW interface 106 transmits the master setting information to the microscope device 200, which is the transmission source of the request.

As described above, in the system 1, when the processing illustrated in FIG. 26 is carried out, the master setting information received from the data processor 100 is registered in the microscope device 200 as own-device-setting information. As a result, manual input of the own-device-setting information to the microscope device 200 becomes unnecessary, and correct setting information can be readily registered. This point is particularly effective and advantageous when a large number of microscope devices 200 are included in the system 1 and when the multiple microscope devices 200 are placed in multiple base sites. As a result of the processing in FIG. 26 being carried out between the data processor 100 and each of the multiple microscope devices 200, the same setting information is registered among the multiple microscope devices 200. This allows the multiple microscope devices 200 to conduct inspections with a certain level of quality.

Next, another processing carried out by the system 1 to allow the multiple microscope devices 200 to conduct inspections with a certain level of quality is explained with reference to FIG. 29 to FIG. 33. Note that the processing illustrated in FIG. 29 is carried out after the processing in FIG. 9 and the processing in FIG. 26.

Figure 30:
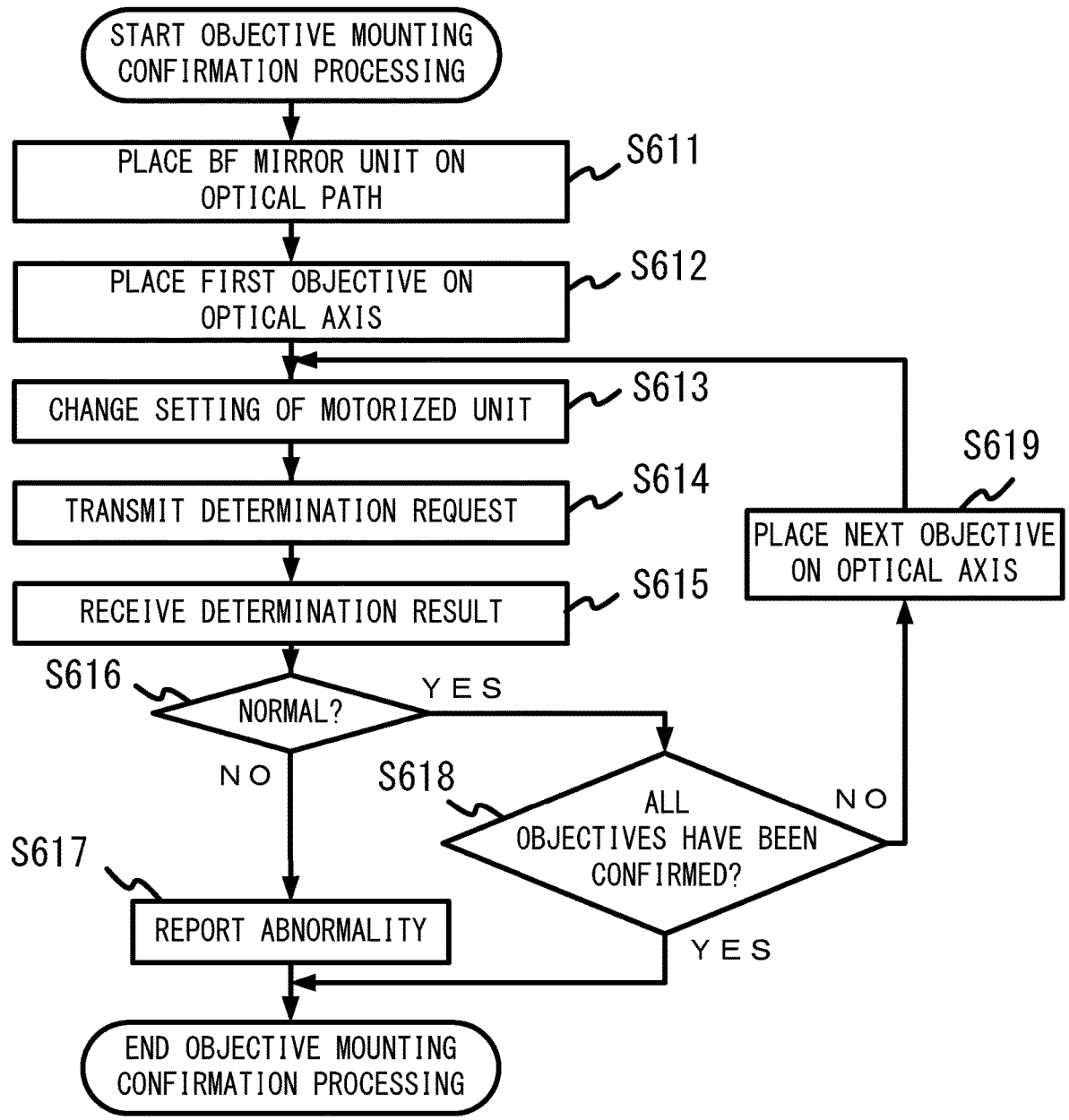
FIG. 30 is an example of a flowchart of objective mounting confirmation processing.
Figure 31:
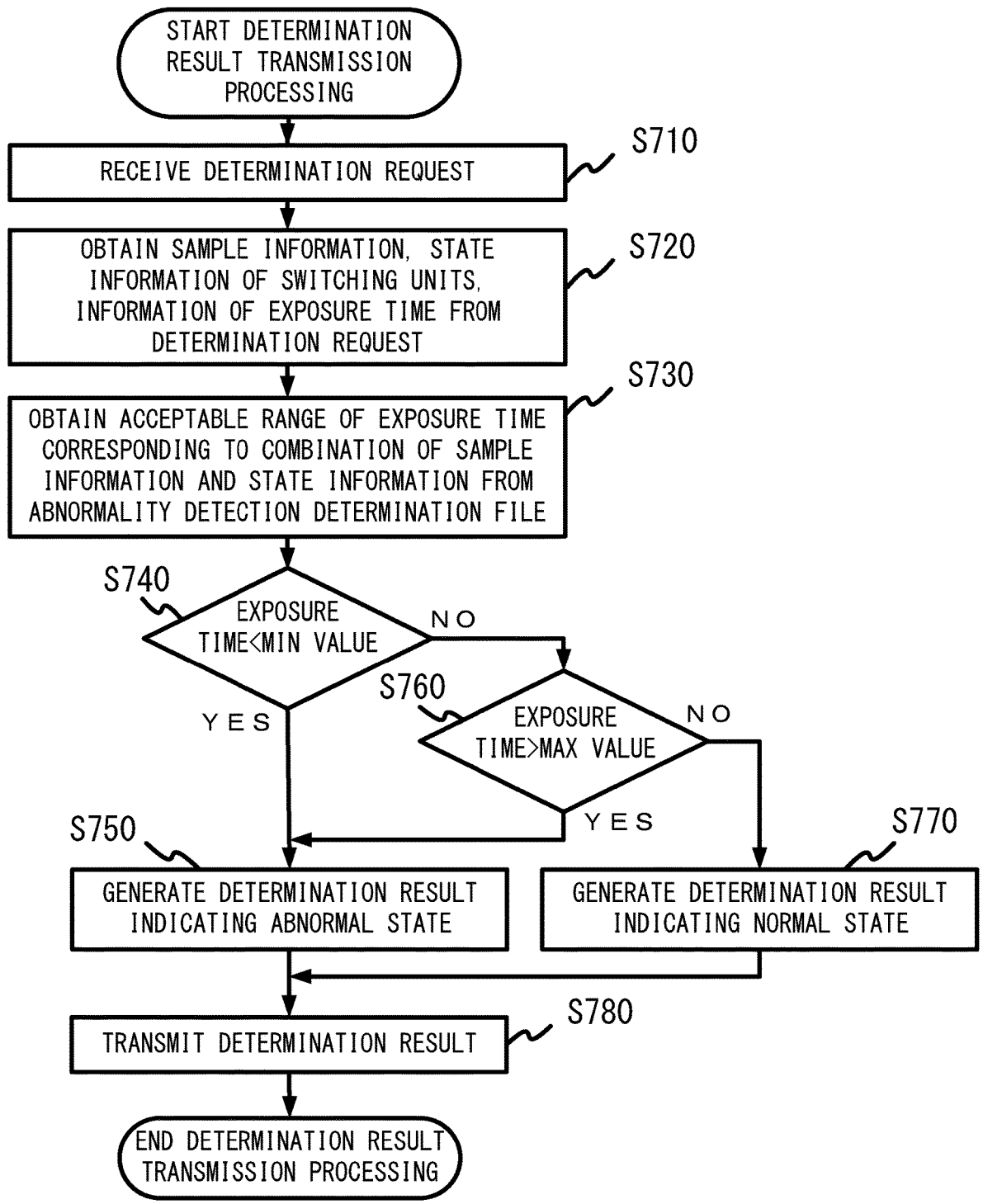
FIG. 31 is an example of a flowchart of determination result transmission processing.
Figure 32:
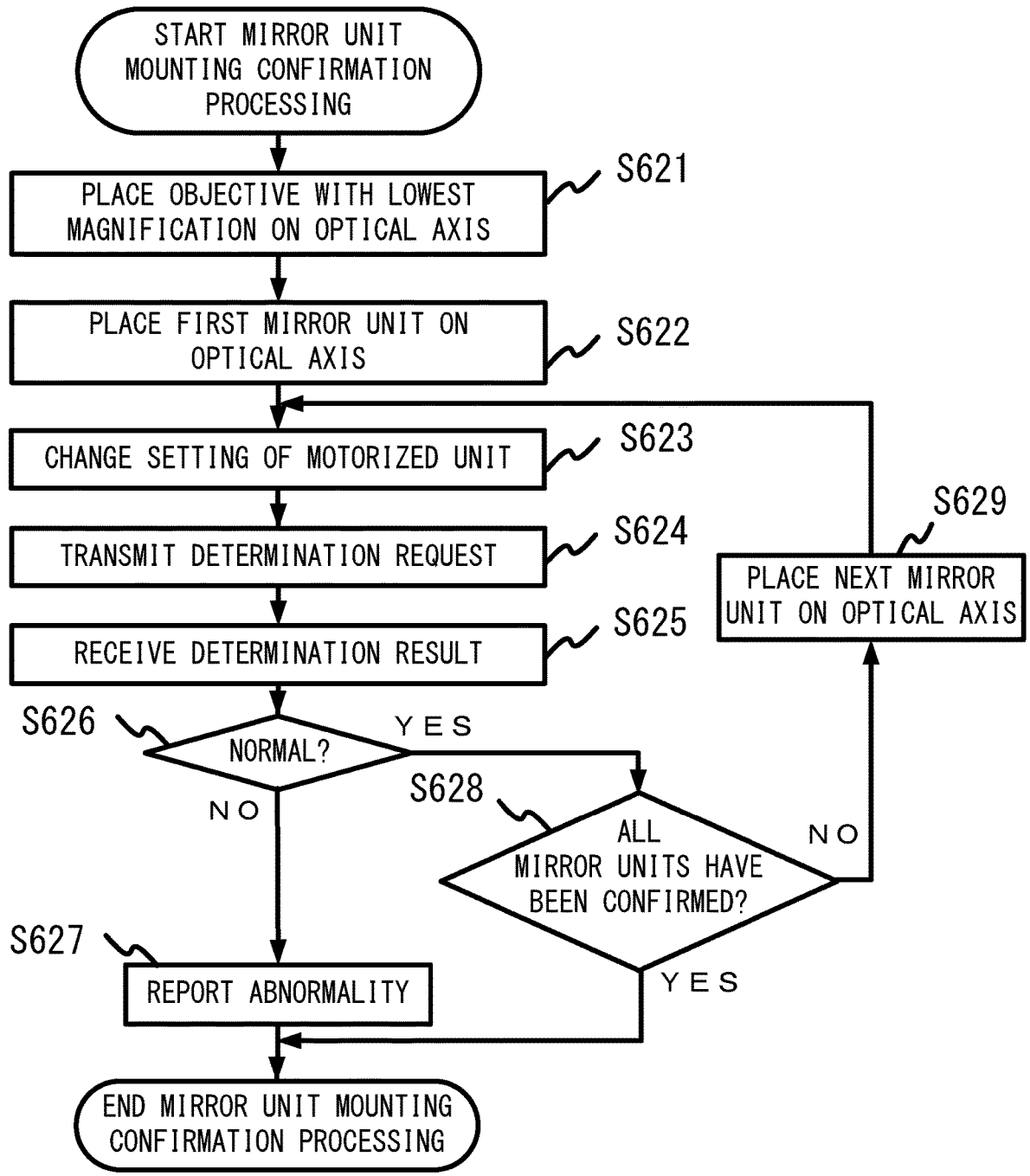
FIG. 32 is an example of a flowchart of mirror unit mounting confirmation processing.

FIG. 29 is a sequence diagram illustrating, as an example, another processing carried out by the system 1. FIG. 30 is an example of a flowchart of the objective mounting confirmation processing. FIG. 31 is an example of a flowchart of the determination result transmission processing. FIG. 32 is an example of a flowchart of the mirror unit mounting confirmation processing. FIG. 33 is a diagram illustrating, as an example, a mounting confirmation screen.

The processing illustrated in FIG. 29, which is conducted by the system 1, includes the mounting confirmation processing (step S600) carried out by the microscope device 200 and the determination result transmission processing (step S700) carried out several times by the data processor 100. At least a determination request and a determination result are exchanged between the microscope device 200 and the data processor 100. Note that the processing in FIG. 29 is preferably carried out between the data processor 100 and each of the multiple microscope devise 200 except for the microscope device 200 in which the processing illustrated in FIG. 9 has been carried out.

An explanation of the mounting confirmation processing is provided. When the system 1 starts the processing illustrated in FIG. 29, the microscope device 200 carries out the objective mounting confirmation processing illustrated in FIG. 30 and the mirror unit mounting confirmation processing illustrated in FIG. 32 (step S600).

An explanation of the objective mounting confirmation processing is provided. In the objective mounting confirmation processing, the microscope device 200 places the BF mirror unit 13a on the optical path (step S611). Note that when the mirror slider 13 is not a motorized slider but is a manually-operated slider, the display device 50 displays a message to urge the placement of the BF mirror unit 13a on the optical path. In response to the message, a user operates the mirror slider 13 and places the BF mirror unit 13a on the optical path. The reason that the BF mirror unit 13a is placed in step S611 is that a larger change in the exposure time is caused by the difference in the objectives when the BF mirror unit 13a is placed than when other mirror units are placed.

In addition, the microscope device 200 places the first objective on the optical path (step S612). Note that when the nosepiece 14 is not a motorized nosepiece but is a manually-operated nosepiece, the display device 50 displays a message that urges the placement of the first objective on the optical path. In response to the message, the user operates the nosepiece 14 and places the first objective on the optical path.

Next, the microscope device 200 changes the setting of motorized units (step S613). More specifically, the processor 31 detects the state of the switching units (the mirror slider 13 and the nosepiece 14) based on the outputs from the position sensor 13s and the position sensor 14s and changes the setting of the motorized units in accordance with the customizing setting information that corresponds to the type of microscopy to be used.

The microscope device 200 transmits a determination request (step S614). In step S614, when a user presses the icon C1 in the main screen by using the input device 60, the screen G5 illustrated in FIG. 33 is displayed on the display device 50. Here, the screen G5 is a mounting confirmation screen. A region R11 is a region to select the sample 17 placed on the stage 16. Afterwards, the user selects the sample 17 in the region R11 by using the input device 60. When the user presses the button B5, the communication device 40 transmits, to the data processor 100, a determination request that includes the device state file of the microscope device 200 at that point in time.

Note that the determination request does not necessarily include all pieces of information included in the device state file. The determination request just needs to include at least the sample information, the information indicating the exposure time, and the information indicating the state of switching units.

Afterwards, the microscope device 200 receives a determination result (step S615) and determines whether the microscope device 200 is normal or not (step S616). More specifically, the communication device 40 receives the determination result, which is a response to the determination request, from the data processor 100, and the processor 31 determines whether the microscope device 200 is in a normal state or not based on the determination result. Note that the determination result is information indicating whether the microscope device 200 is in a normal state or in an abnormal state.

When the microscope device 200 is determined to be in an abnormal state (step S616, NO), the microscope device 200 reports the abnormality of the microscope device 200 (step S617) and ends the objective mounting confirmation processing. In other words, the processor 31, when detecting an abnormality based on the response to the determination request from the data processor 100, reports the abnormality of the microscope device 200 to the user.

Note that the method of reporting is not limited in particular. The processor 31 may display a message etc. reporting the abnormality on the display device 50. The processor 31 may also report the abnormality to the user by using sounds, vibration, etc.

When the microscope device 200 is determined to be in a normal state (step S616, YES), the microscope device 200 determines whether the confirmation has been conducted on all of the objectives mounted on the nosepiece 14 or not (step S618). When the microscope device 200 determines a state in which the confirmation has not been conducted on not all of the objectives, the microscope device 200 places the next objective on the optical path (step s619) and carries out again the processing in step S613 to the processing in step S618. When the microscope device 200 determines a state in which the confirmation has been conducted on all of the objectives, the microscope device 200 ends the objective mounting confirmation processing.

An explanation of the determination result transmission processing is provided. When the system 1 starts the processing illustrated in FIG. 29 and the microscope device 200 transmits a determination request, the data processor 100 carries out the determination result transmission processing illustrated in FIG. 31 (step S700).

In the determination result transmission processing, the data processor 100 receives a determination request (step S710). More specifically, the NW interface 106 receives, from the microscope device 200, the determination request including at least sample information for specifying a sample of which an image was captured by the imaging device 19, exposure time information of the imaging device 19, and state information of switching units.

Afterwards, the data processor 100 obtains, from the determination request, the sample information, the exposure time information, and the state information of switching units (step S720). In addition, the data processor 100 obtains, from an abnormality detection determination file including the determination information, an acceptable range of exposure time that corresponds to a combination of the sample information and the state information obtained in step S720 (step S730).

Afterwards, the data processor 100 determines whether the exposure time indicated by the exposure time information obtained in step S720 is within the acceptable range of exposure time obtained in step S730 or not (step S740, step S760).

When the exposure time is not within the acceptable range of exposure time, the data processor 100 generates a determination result indicating an abnormal state (step S750), transmits the generated determination result to the microscope device 200, which is the transmission source of the determination request, (step S780), and ends the determination result transmission processing. On the other hand, when the exposure time is within the acceptable range of exposure time, the data processor 100 generates a determination result indicating a normal state (step S770), transmits the generated determination result to the microscope device 200, which is the transmission source of the determination request, (step S780), and ends the determination result transmission processing.

In other words, the processor 101 generates a determination result indicating whether the microscope device 200, which is the transmission source of the determination request, is in a normal state or in an abnormal state based on the determination request and the determination information. In addition, in response to the determination request, the NW interface 106 transmits the generated determination result to the microscope device 200, which is the transmission source of the determination request.

Next, an explanation of the mirror unit mounting confirmation processing is provided. In the mirror unit mounting confirmation processing, the microscope device 200 places an objective with the lowest magnification on the optical path (step S621). Note that when the nosepiece 14 is not a motorized nosepiece but is a manually operated nosepiece, the display device 50 displays a message to urge the placement of an objective with the lowest magnification on the optical path. In response to the message, the user operates the nosepiece 14 and places the objective with the lowest magnification on the optical path.

In addition, the microscope device 200 places the first mirror unit on the optical path (step S622). Note that when the mirror slider 13 is not a motorized slier but is a manually operated slider, the display device 50 displays a message to urge the placement of the first mirror unit on the optical path. In response to the message, the user operates the mirror slider 13 and places the first mirror unit on the optical path.

Afterwards, the microscope device 200 changes the setting of the motorized units (step S623), transmits a determination request (step S624), receives a determination result (step S625), and determines whether the microscope device 200 is in a normal state or not (step S626). Note that the processing is the same as the processing in step S613 to the processing in step S616 illustrated in FIG. 30. However, in step S624, the user presses the button B6 in the screen G5.

When the microscope device 200 is determined to be in an abnormal state (step S626, NO), the microscope device 200 reports the abnormality of the microscope device 200 (Step S627) and ends the mirror unit mounting confirmation processing. Note that the processing in step S627 is the same as the processing in step S617 illustrated in FIG. 30.

When the microscope device 200 is determined to be in a normal state (step S626, YES), the microscope device 200 determines whether the confirmation has been conducted on all of the mirror units or not (step S628). When the microscope device 200 determines a state in which the confirmation has not been conducted on not all of the mirror units, the microscope device 200 places the next mirror unit on the optical path (step s629) and carries out again the processing in step S623 to the processing in step S628. When the microscope device 200 determines a state in which the confirmation has been conducted on all of the objectives, the microscope device 200 ends the mirror unit mounting confirmation processing.

As described above, in the system 1, carrying out the processing illustrated in FIG. 29 enables the confirmation of whether proper optical devices are mounted on the multiple mounting positions of the switching units or not. In other words, it is possible to confirm that the optical devices are actually mounted as per the mount setting information included in the own-device-setting information. This makes use of the fact that the exposure time of the imaging device 19 on which autoexposure control is performed is different for different optical devices mounted.

Figure 35:
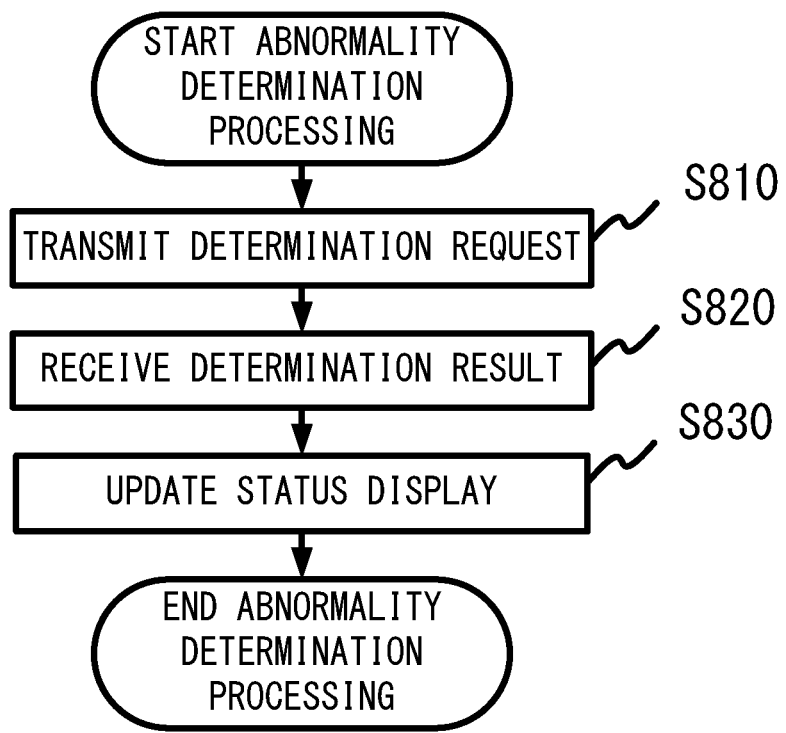
FIG. 35 is an example of a flowchart of abnormality determination processing.
Figure 36:
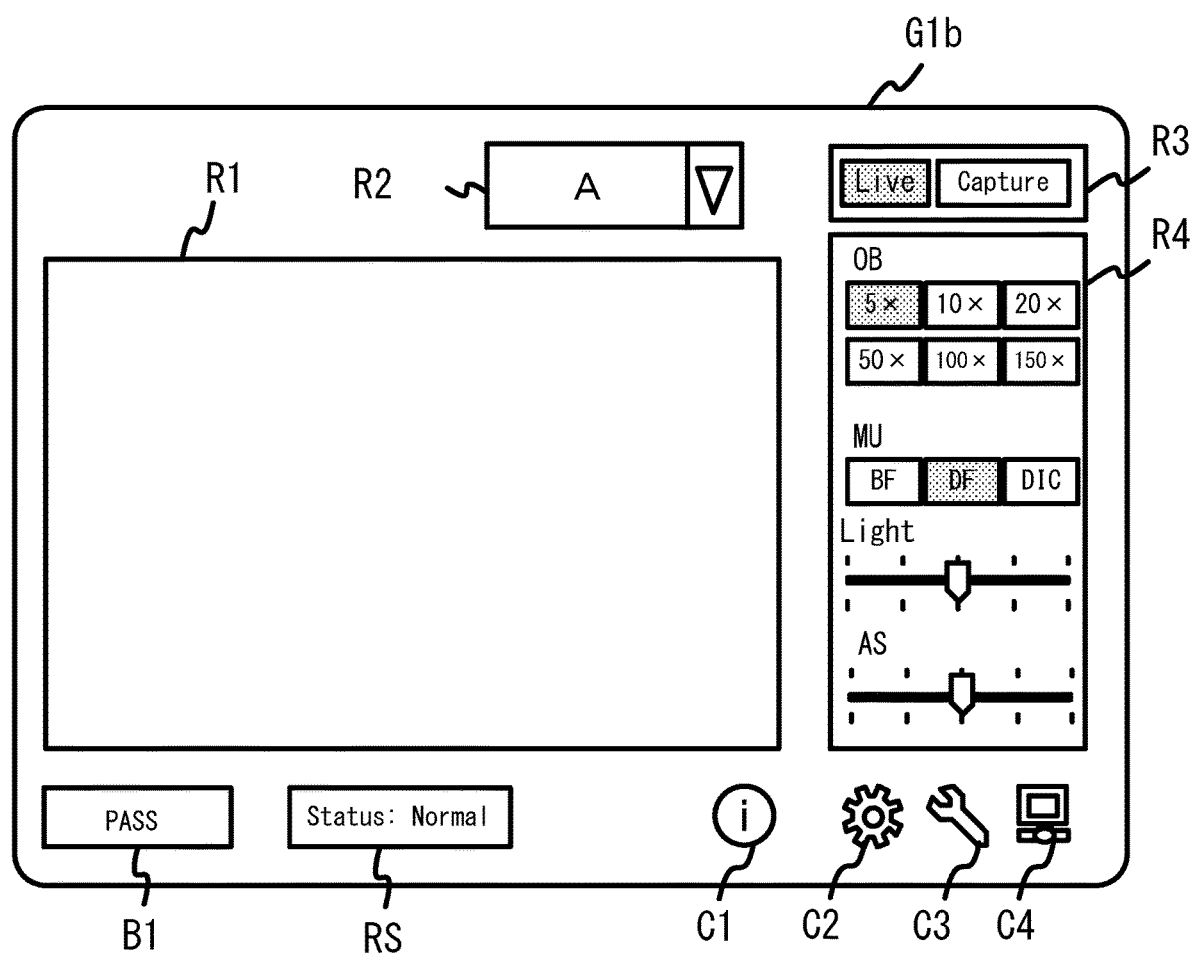
FIG. 36 is a diagram illustrating, as an example, a main screen.

Next, an explanation of the other processing carried out by the system 1 to allow the multiple microscope devices 200 to conduct inspections with a certain level of quality is provided with reference to FIG. 34 to FIG. 36. Note that, similarly to the processing illustrated in FIG. 29, the processing illustrated in FIG. 34 is carried out after the processing in FIG. 9 and the processing in FIG. 26.

FIG. 34 is a sequence diagram illustrating, as an example, the other processing carried out by the system 1. FIG. 35 is an example of a flowchart of the abnormality determination processing. FIG. 36 is a diagram illustrating, as an example, the main screen.

The processing illustrated in FIG. 34 carried out by the system 1 is carried out between the data processor 100 and the microscope device 200 of a condition in which the device state file and the log file are periodically uploaded. The condition is specified in the transmission file setting screen illustrated in FIG. 21. More specifically, the processing illustrated in FIG. 34 includes the abnormality determination processing (step S800) carried out by the microscope device 200 and the determination result transmission processing (step S700) carried out by the data processor 100.

The determination result transmission processing included in the processing illustrated in FIG. 34 is the same as the determination result transmission processing included in the processing illustrated in FIG. 29. At least a determination request and a determination result are exchanged between the microscope device 200 and the data processor 100. The processing in FIG. 34 is preferably carried out between the data processor 100 and each of the multiple microscope devices 200.

An explanation of the determination request processing is provided. When the system 1 starts the processing illustrated in FIG. 34, the microscope device 200 carries out the abnormality determination processing illustrated in FIG. 35 (step S800).

In the abnormality determination request processing, the microscope device 200 transmits a determination request (step S810). This processing is the same as the processing in step S614 in FIG. 30 except that a determination request including the device state file is periodically transmitted to the data processor 100.

Afterwards, the microscope device 200 receives a determination result (step S820). This processing is the same as the processing in step S615 in FIG. 30.

Finally, the microscope device 200 updates a status display (step S830) and ends the determination request processing. More specifically, the processor 31 determines the state of the microscope device 200 based on the determination result received in step S820. When the microscope device 200 is determined to be in a normal state, the processor 31 displays "Status: normal" in a region RS in the main screen as indicated in the screen G1b in FIG. 36. On the other hand, when the microscope device 200 is determined to be in an abnormal state, the processor 31 displays "Status: abnormal" in the region RS in the main screen.

As described above, in the system 1, carrying out the processing illustrated in FIG. 34 enables the user to know the state of the microscope device 200 at any point in time. For example, when the microscope device 200 is in an abnormal state even though both the input setting information and the mounted optical devices are proper, deterioration or failure etc. in the microscope device 200 is suspected. Because the microscope device 200 is used for inspection after the user confirms that the microscope device 200 is in a normal state, the quality level of the inspection can be maintained.

Second Embodiment

FIG. 37 is a diagram illustrating, as an example, a configuration of a system 2 according to the second embodiment. The system 2 illustrated in FIG. 37 is different in that routers (a router 401, a router 402) are provided for each base site and that a router and the microscope device 200 are coupled via a wired LAN. Accordingly, in the system 2, the NW interface 36 is a communication unit of the microscope device 200. The system 2 according to the present embodiment can also obtain the same advantageous effect as that of the system 1 according to the first embodiment.

Third Embodiment

The configuration of a system according to the present embodiment is the same as the system 1 according to the first embodiment. For that reason, the components of the system according to the present embodiment are referenced by the same reference numbers as those of the components of the system 1. The following description explains the differences between the processing carried out by the system according to the present embodiment to allow multiple microscope devices 200 to conduct inspections with a certain level of quality and the processing carried out by the system 1.

In the present embodiment, instead of the exposure time of the imaging device 19 the microscope device 200 transmits image quality information of the microscopic image obtained by the imaging device 19 as leaning information in the processing illustrated in FIG. 9. In other words, the leaning information transmitted by the communication unit of the microscope device 200 includes at least sample information, image quality information and state information of switching units. For example, the image quality information may be the contrast of the microscopic image, a frame rate of the microscopic image, or both. Note that the frame rate of the microscopic image is a frame rate of a microscopic image that is a live camera image.

Figure 38:
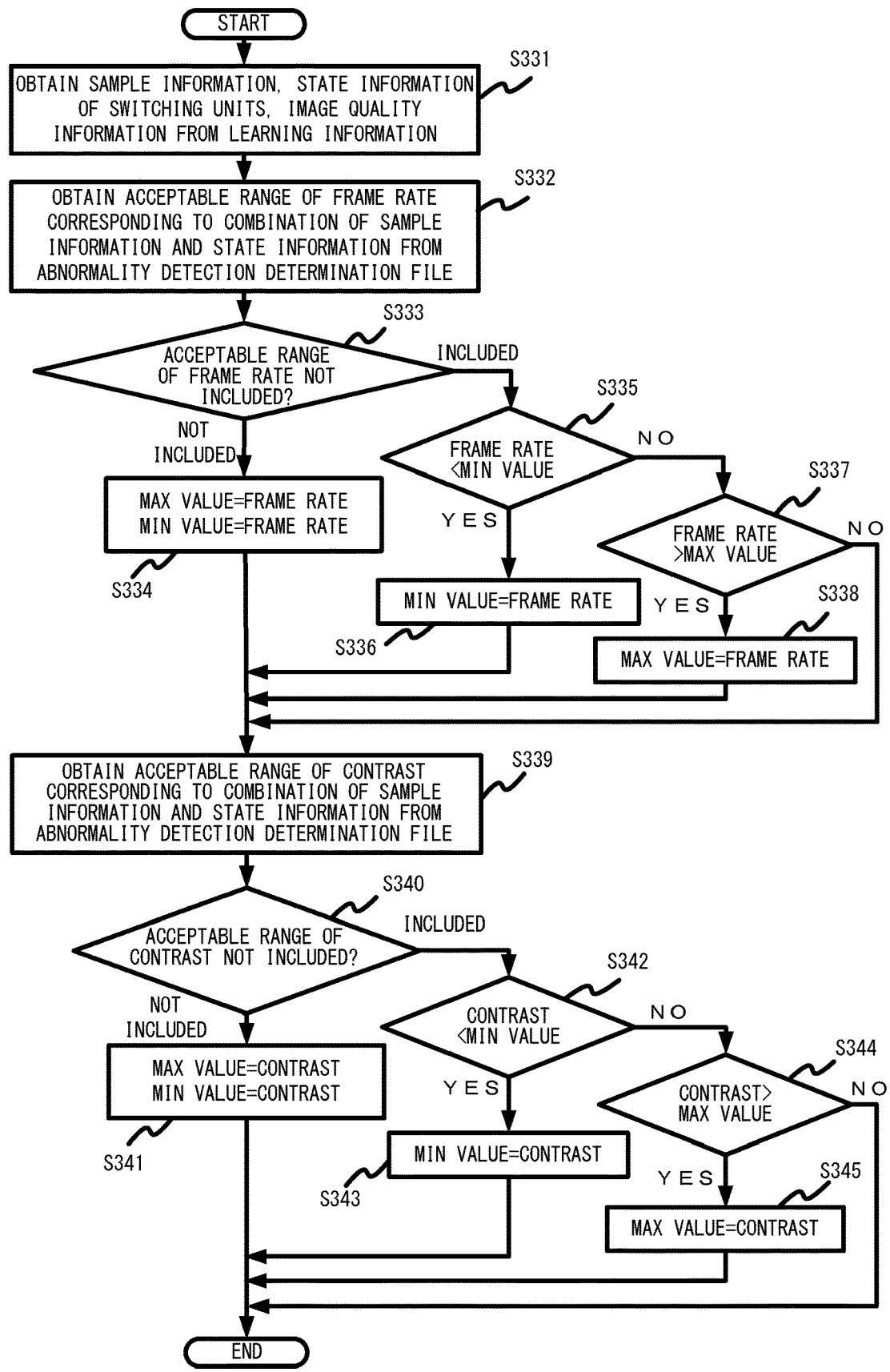
FIG. 38 is another example of a flowchart of determination information registration/update processing.

FIG. 38 is another example of a flowchart of the determination information registration/update processing. FIG. 39 is a diagram illustrating another example of an abnormality detection determination file. The system according to the present embodiment carries out the determination information registration/update processing illustrated in FIG. 38, instead of the determination information registration/update processing illustrated in FIG. 14, in the learning processing included in the processing illustrated in FIG. 9. In the following description, the learning processing carried out by the data processor 100 according to the present embodiment is explained with reference to FIG. 38 and FIG. 39.

Upon receiving learning information, the data processor 100 carries out the determination information registration/update processing illustrated in FIG. 38. In the determination information registration/update processing, the processor 101 obtains sample information, image quality information and state information of switching units from the received learning information (step S331).

The processor 101 reads out an acceptable range of frame rate that corresponds to a combination of the sample information and the state information obtained in step S331 from the abnormality detection determination file (step S332). The processing after reading out the acceptable range of frame rate (in step S333 to step S338) is the same as the processing in step S323 to step S328 in FIG. 14 except that a frame rate, which is one type of image quality information obtained in step S331, is used instead of the exposure time.

In addition, the processor 101 reads out an acceptable range of contrast that corresponds to a combination of the sample information and the state information obtained in step S331 from the abnormality detection determination file (step S339). The processing after reading out the acceptable range of contrast (in step S340 to step S345) is the same as the processing in step S323 to step S328 in FIG. 14 except that contrast, which is one type of image quality information obtained in step S331, is used instead of the exposure time.

Files F6a to F6f illustrated in FIG. 39 are examples of the abnormality detection determination file. Note that FIG. 39 provides an example in which an abnormality detection determination file is generated for each combination of the type of sample and the mirror unit, but the conditions of generation of the abnormality detection determination file are not limited in particular.

As described above, similarly to the system 1, the system according to the present embodiment can also register master setting information and determination information in the data processor 100. In addition, since the acceptable range of image quality becomes more appropriate as the data processor 100 repeatedly carries out the learning processing, the determination information can be updated to be more appropriate determination information.

Figure 40:
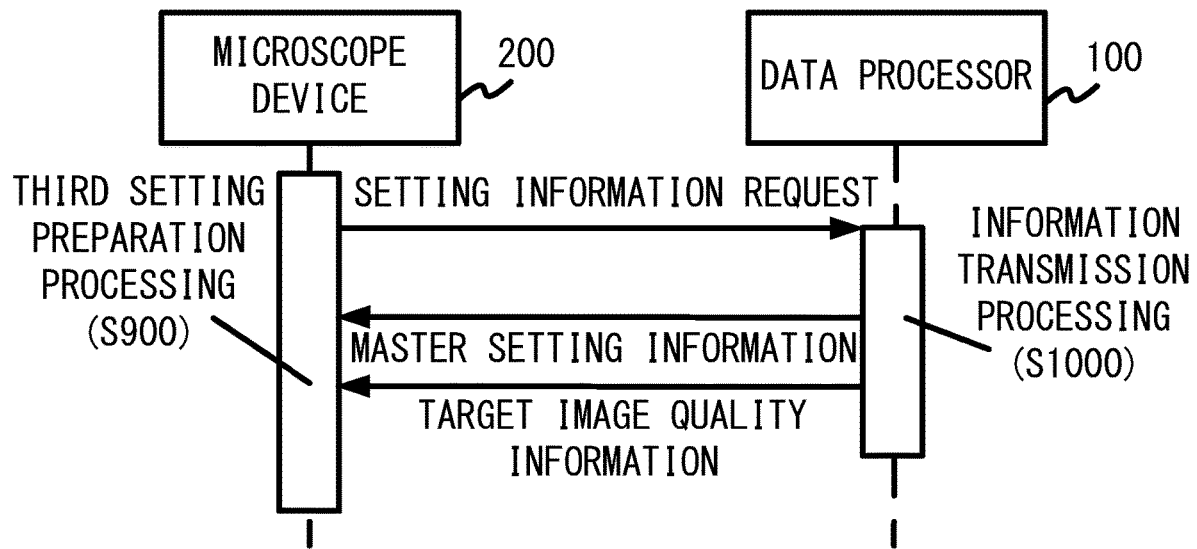
FIG. 40 is a sequence diagram illustrating, as an example, processing carried out by the system according to the third embodiment.
Figure 41:
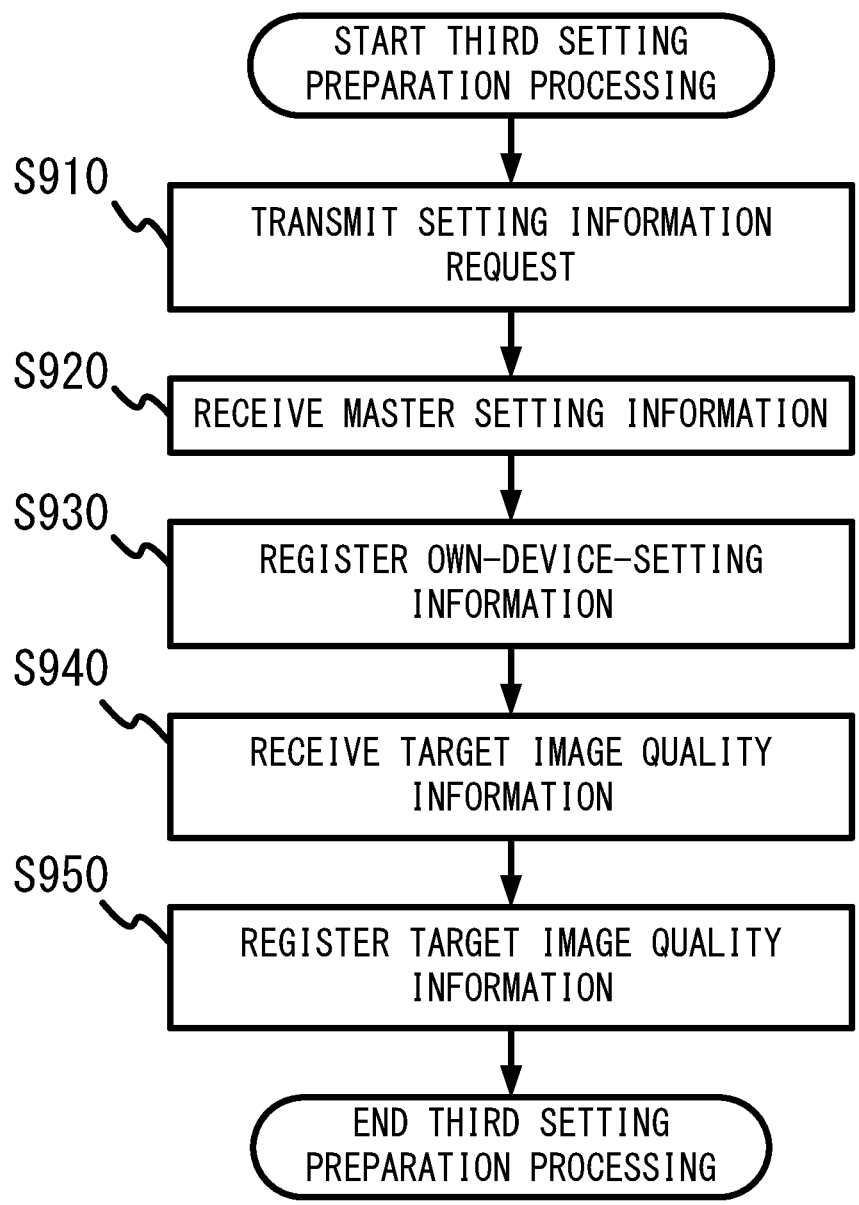
FIG. 41 is an example of a flowchart of third setting preparation processing.
Figure 43:
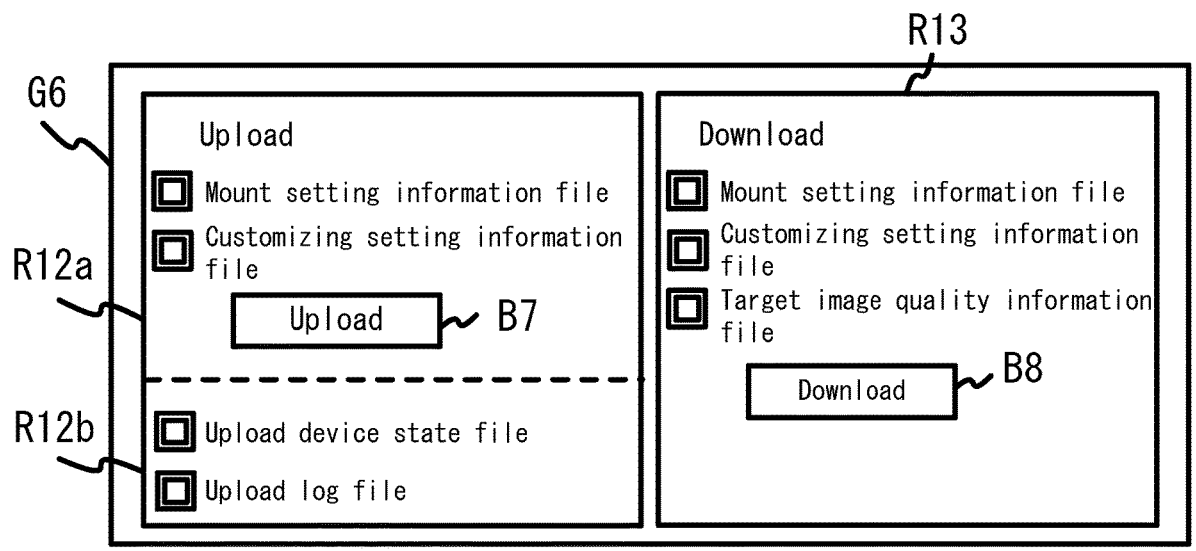
FIG. 43 is a diagram illustrating, as an example, a transmission file setting screen.

FIG. 40 is a sequence diagram illustrating, as an example, processing carried out by the system according to the present embodiment. FIG. 41 is an example of a flowchart of the third setting preparation processing. FIG. 42 is an example of a flowchart of the information transmission processing. FIG. 43 is a diagram illustrating, as an example, the transmission file setting screen. FIG. 44 is a diagram illustrating an example of the target image quality information file.

The system according to the present embodiment carries out the processing illustrated in FIG. 40 instead of the processing illustrated in FIG. 26 in order to allow multiple microscope devices 200 to conduct inspections with a certain level of quality. In the following description, the processing illustrated in FIG. 40 is explained with reference to FIG. 40 to FIG. 44.

The processing illustrated in FIG. 40 includes the third setting preparation processing (step S900) carried out by the microscope device 200 and the information transmission processing (step S1000) carried out by the data processor 100. At least a setting information request, master setting information, and target image quality information are exchanged between the microscope device 200 and the data processor 100. Note that the processing in FIG. 40 is preferably carried out between the data processor 100 and each of the multiple microscope devices 200.

An explanation of the third setting preparation processing is provided. When the system starts the processing illustrated in FIG. 40, the microscope device 200 carries out the third setting preparation processing illustrated in FIG. 41

(step S900). The microscope device 200 transmits a setting information request to the data processor 100 (step S910).

In step S910, when a user presses the icon C4 in the main screen by using the input device 60, a screen G6 illustrated in FIG. 43 is displayed on the display device 50. The screen G6 is a transmission file setting screen. A region R12a and a region R12b are regions to specify a file to be uploaded from the microscope device 200 to the data processor 100. The file specified in the region R12a is uploaded when the button B7 is pressed. A region R13 is a region to specify a file to be downloaded from the data processor 100 to the microscope device 200. The file specified in the region R13 is downloaded when the button B8 is pressed. The screen G6 is different from the screen G4 illustrated in FIG. 21 in that a target image quality information file can be selected as a file to be downloaded.

By using the input device 60, the user specifies a mount setting file, a customizing setting file, and a target image quality information file as files to be downloaded in the region R13 of the screen G6. Afterwards, when the user presses the button B8, the communication device 40 transmits a setting information request to the data processor 100. The processing in step S920 and the processing in step S930 are the same as the processing in step S420 and the processing in step S430, respectively, in FIG. 27.

Afterwards, the microscope device 200 receives target image quality information from the data processor 100 (step S940). More specifically, the communication device 40 receives multiple pieces of target image quality information that correspond to multiple types of microscopy from the data processor 100. The target image quality information is information for absorbing individual differences of the microscope devices and realizing a certain level of inspection quality.

Finally, the microscope device 200 registers the target image quality information (step S950) and ends the third setting preparation processing. More specifically, the processor 31 generates, in the storage 34, a target image quality information file that is a file including the target image quality information received by the communication device 40. Note that when the target image quality information file has already been generated, content of the file is updated with the target image quality information received in step S940.

Files F7a to F7c illustrated in FIG. 44 are examples of the target image quality information file. Note that FIG. 44 provides an example in which a target image quality information file is generated for each combination of the type of sample and the mirror unit, but the conditions of generation of the target image quality information file are not limited in particular.

An explanation of the information transmission processing is provided. When the system starts the processing illustrated in FIG. 40 and the microscope device 200 transmits a setting information request, the data processor 100 carries out the information transmission processing illustrated in FIG. 42 (step S1000).

Figure 28:
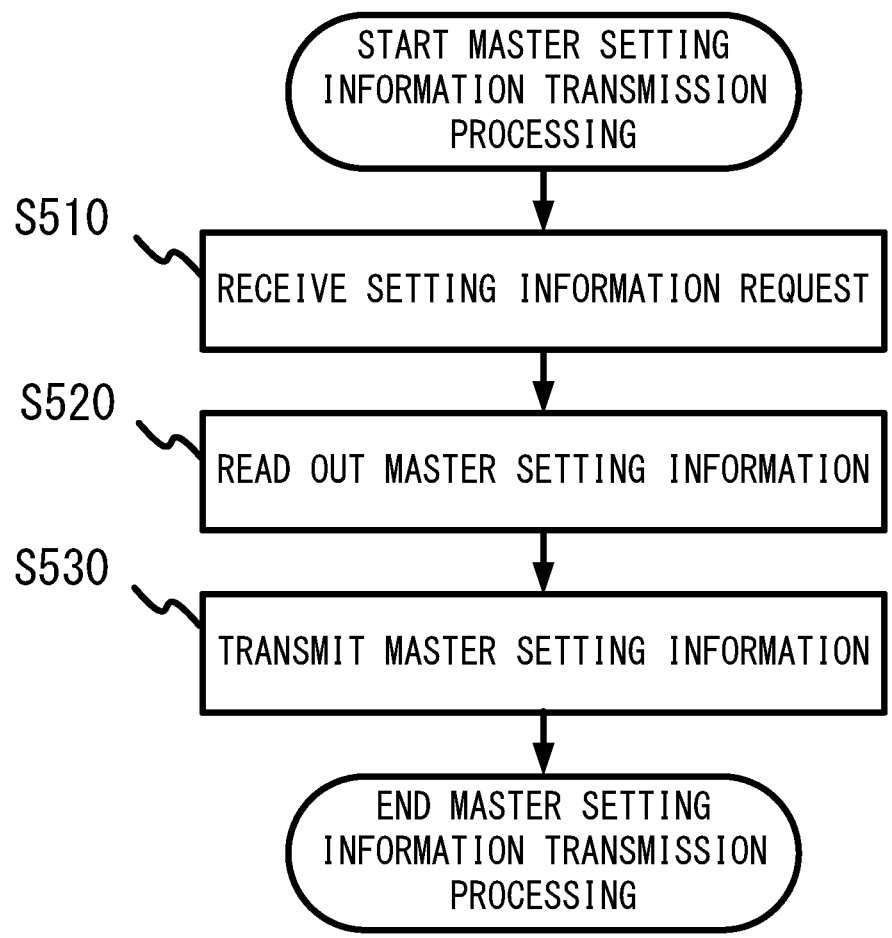
FIG. 28 is an example of a flowchart of master setting information transmission processing.

The processing in step S1010 to the processing in step S1030 in the information transmission processing are the same as the processing in step S510 to the processing in step S530 in FIG. 28.

Afterwards, the data processor 100 generates target image quality information (step S1040). More specifically, the processor 101 reads out an acceptable range of frame rate and an acceptable range of contrast from the abnormality detection determination file illustrated in FIG. 39 for each combination of the sample information and the state information of switching units. The processor 101 calculates a target frame rate from the acceptable range of frame rate and also calculate a target contrast from the acceptable range of contrast. Note that the target frame rate is an intermediate value of the maximum value and the minimum value of the acceptable frame rate (=(maximum value+minimum value)/2) as an example. The target contrast is an intermediate value of the maximum value and the minimum value of the acceptable contrast (=(maximum value+minimum value)/2) as an example.

Finally, the data processor 100 transmits the target image quality information to the microscope device 200 (step S1050) and ends the information transmission processing. More specifically, in response to a setting information request, the NW interface 106 transmits the target image quality information to the microscope device 200, which is a transmission source of the request.

As described above, in the system according to the present embodiment, when the processing illustrated in FIG. 40 is carried out, the master setting information received from the data processor 100 is registered in the microscope device 200 as own-device-setting information. As a result, manual input of the own-device-setting information to the microscope device 200 becomes unnecessary, and correct setting information can be readily registered.

In addition, in the system according to the present embodiment, multiple pieces of target image quality information that correspond to multiple types of microscopy are registered in the microscope device 200. When the state of switching units changes in the microscope device 200, the processor 31 changes the setting of motorized units in accordance with the customizing setting information that corresponds to the type of microscopy to be used and the target image quality information that corresponds to the type of microscopy to be used.

When there is an individual difference between the microscope device 200 that generated the customizing setting information and uploaded the customizing setting information to the data processor 100 (denoted as the first microscope device) and the microscope device 200 that downloaded the customizing setting information (denoted as the second microscope device), in the system 1, the microscope devices 200 with the same setting may sometimes have images of different image quality. In the system according to the present embodiment, however, the setting of motorized units is changed in accordance with the target image quality information in addition to the customizing setting information, even when multiple microscope devices 200 have individual differences, the multiple microscope devices 200 can have an image with a certain level of image quality. Accordingly, it is possible to allow multiple microscope devices 200 to conduct inspections with a certain level of quality.

In the present embodiment, in the processing illustrated in FIG. 29 and the processing illustrated in FIG. 34, the microscope device 200 causes the determination request transmitted to the data processor 100 to include image quality information of the microscopic image obtained in the imaging device 19 instead of the exposure time of the imaging device 19. In other words, the determination request transmitted by the communication unit of the microscope device 200 includes at least sample information, image quality information, and state information of switching units.

In the processing illustrated in FIG. 29 and the processing illustrated in FIG. 34, the data processor 100 carries out the determination result transmission processing illustrated in FIG. 45 instead of the determination result transmission processing illustrated in FIG. 31. FIG. 45 is another example of a flowchart of the determination result transmission processing.

In the determination result transmission processing, the data processor 100 receives a determination request (step S1110). More specifically, the NW interface 106 receives, from the microscope device 200, a determination request that includes at least sample information, image quality information, and state information of switching units.

Afterwards, the data processor 100 obtains, from the determination request, the sample information, the image quality information, and the state information of switching units (step S1120). In addition, the data processor 100 obtains an acceptable range of frame rate and an acceptable range of contrast that correspond to a combination of the sample information and the state information obtained in step S1120 from an abnormality detection determination file that includes determination information (step S1130).

Afterwards, the data processor 100 determines whether or not a frame rate indicated by the image quality information obtained in step S1120 is within the acceptable range of frame rate obtained in step S1130 and contrast indicated by the image quality information obtained in step S1120 is within the acceptable range of contrast obtained in step S1130 (step S1140).

When either or both of the frame rate and the contrast not is/are within the acceptable range, the data processor 100 generates a determination result indicating an abnormal state (step S1150), transmits the generated determination result to the microscope device 200, which is the transmission source of the determination request, (step S1170), and ends the determination result transmission processing. On the other hand, when the frame rate and the contrast are within their acceptable ranges, the data processor 100 generates a determination result indicating a normal state (step S1160), transmits the generated determination result to the microscope device 200, which is the transmission source of the determination request, (step S1170), and ends the determination result transmission processing.

In other words, the processor 101 generates a determination result indicating whether the microscope device 200, which is the transmission source of the determination request, is in a normal state or in an abnormal state based on the determination request and the determination information. In addition, in response to the determination request, the NW interface 106 transmits the generated determination result to the microscope device 200, which is the transmission source of the determination request.

Similarly to the case of the system 1 according to the first embodiment, the system according to the present embodiment also allows a user to know whether the microscope device 200 is in a normal state or in an abnormal state.

Figure 46:
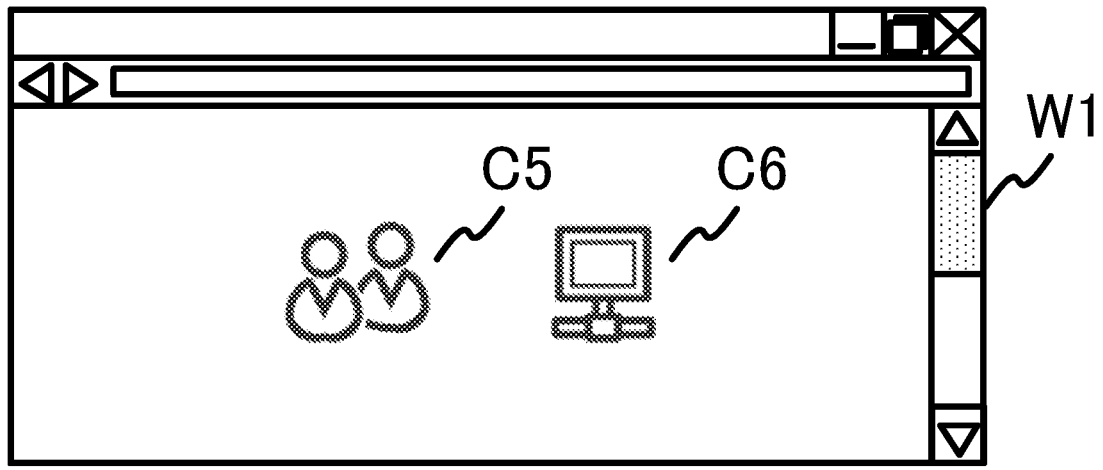
FIG. 46 is a diagram illustrating, as an example, a control screen W1.
Figure 47:
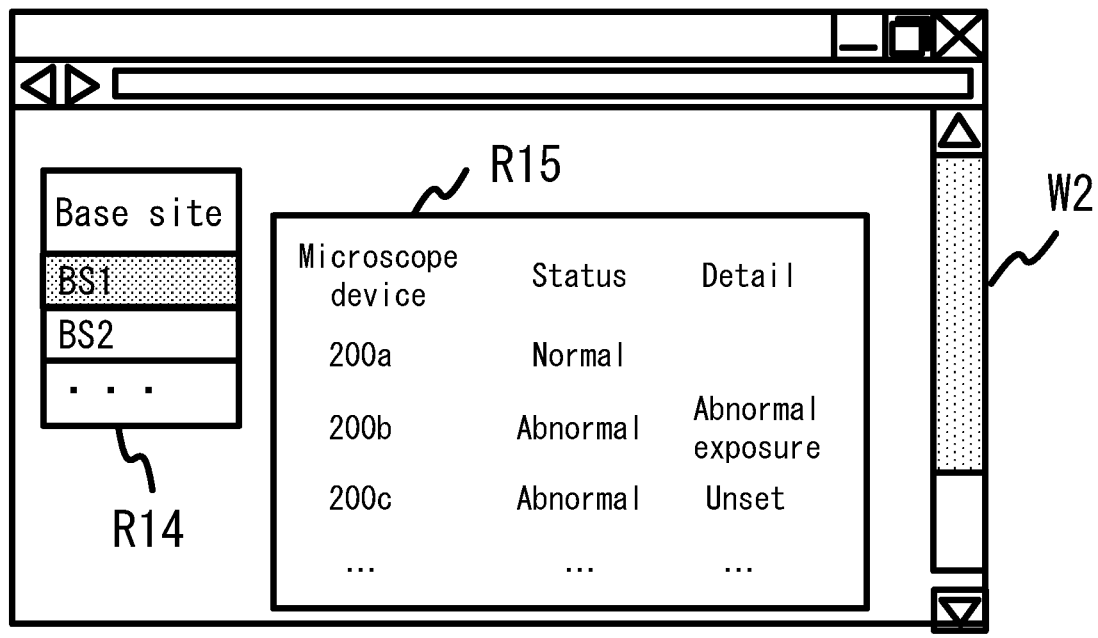
FIG. 47 is a diagram illustrating an example of a status list screen W2.
Figure 48:
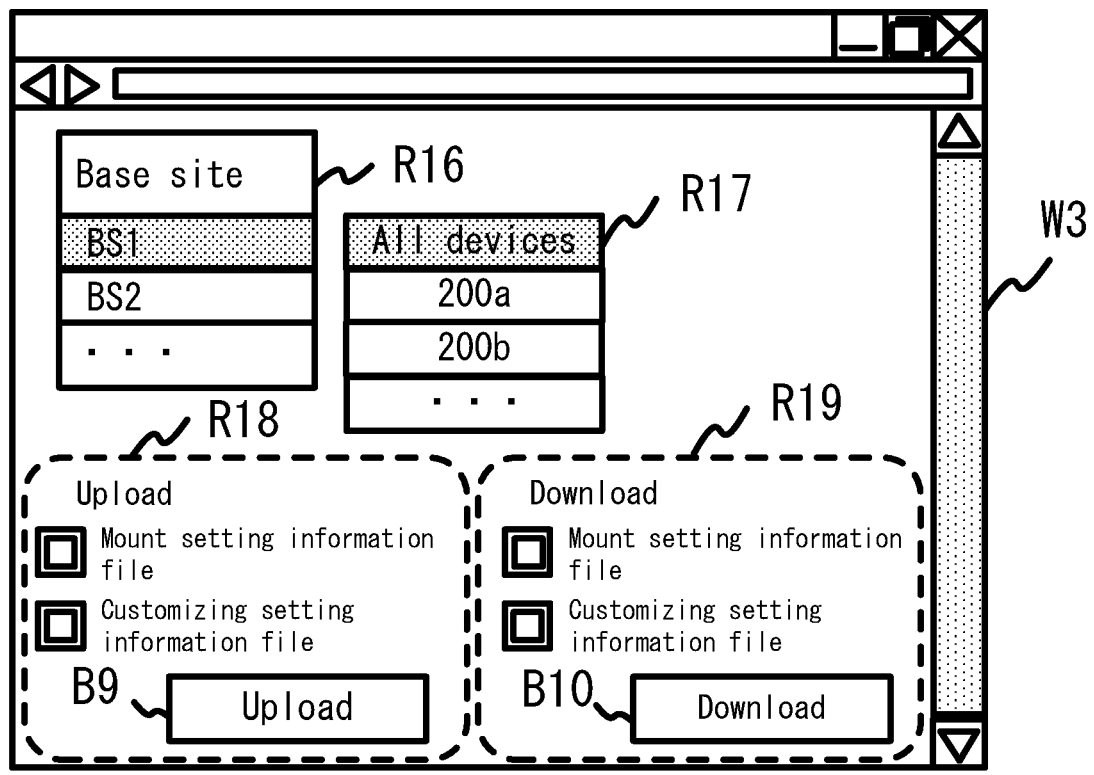
FIG. 48 is a diagram illustrating an example of a transmission file setting screen W3.

Lastly, functions of a control terminal 300 are introduced. FIG. 46 to FIG. 48 are diagrams illustrating examples of screens displayed on the control terminal 300. FIG. 46 is a diagram illustrating, as an example, a control screen W1. FIG. 47 is a diagram illustrating, as an example, a status list screen W2. FIG. 48 is a diagram illustrating, as an example, a transmission file setting screen W3.

The data processor 100 has web server software installed. In addition, a web application operated on the web server software is built in the data processor 100. The control terminal 300 accesses the web application of the data processor 100 by using a web browser.

The screen W1 illustrated in FIG. 46 is a top screen of the web application generated on the data processor 100. When an operator of the control terminal 300 selects the icon C5 of the screen W1, the data processor 100 causes the web browser of the control terminal 300 to display the screen W2 illustrated in FIG. 47. The screen W2 displays the state of each microscope device 200 placed in each base site. In response to a determination request transmitted from each microscope device 200, the data processor 100 determines the state of the microscope device 200, which is the transmission source of the determination request. Therefore, the data processor holds information on the state of multiple microscope devices 200. The screen W2 is generated in accordance with the information that the data processor 100 holds.

When the operator of the control terminal 300 selects the icon C6 of the screen W1, the data processor 100 causes the web browser of the control terminal 300 to display the screen W3 illustrated in FIG. 48. When the operator of the control terminal 300 specifies a file to be transmitted in a region R18 and presses the button B9, the operator can let the data processor 100 carry out the uploading processing from the microscope device 200 to the data processor 100 by remote control. In addition, when the operator of the control terminal 300 specifies a file to be transmitted in a region R19 and presses the button B10, the operator can let the data processor 100 carry out the downloading processing from the data processor 100 to the microscope device 200 by remote control. Note that the microscope device 200 involved in the above processing can be specified in the region R16 and the region R17.

The above-described embodiments are merely specific examples to facilitate the understanding of the present invention, and the embodiments of the present invention are not intended to be limited to these examples. Various changes and modification may be made in the microscope device, the data processor, the system, the operation method, and the program without departing from the scope of the claims.

Figure 49:
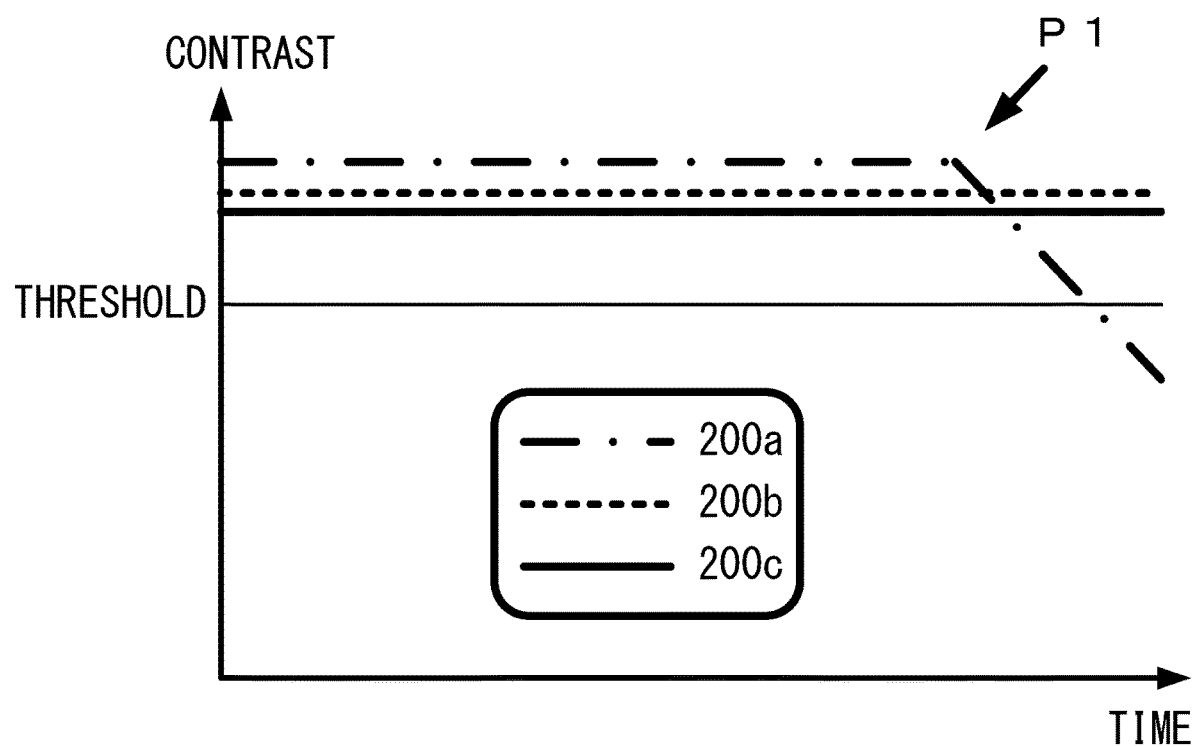
FIG. 49 is a diagram for explaining a method of failure prediction.

An example is herein provided that the data processor 100 detects abnormality in the microscope device 200 by using an abnormality detection determination file, but the data processor 100 may predict occurrence of abnormality in the microscope device 200 before the occurrence of abnormality. For example, by monitoring contrast information of multiple microscope devices 200 and comparing the contrast information between the multiple microscope devices 200, occurrence of specific abnormality of the microscope device 200 may be predicted. By detecting an unnatural change in the contrast information, occurrence of abnormality of the microscope device 200 may be predicted (see the position P1 in FIG. 49 as an example). Or, for example, by calculating the reduction in contrast per unit time, abnormality occurrence time may be predicted.

In the examples described above, the contrast and the frame rate are explained as examples of the image quality information, but the brightness information of the image may also be used as the image quality information.

Note that appended notes are provided below for the invention described in the present specification.

(Appended Note 1)

A data processor that communicates with multiple microscope devices used in multiple types of microscopy over a network, including:

a storage unit configured to store master setting information, wherein the master setting information includes multiple pieces of customizing setting information that correspond to the multiple types of microscopy; and a communication unit configured to transmit, in response to a setting information request from each of the multiple microscope devices, the master setting information to a microscope device, which is a transmission source of the setting information request, by communicating with each of the multiple microscope devise over the network.

(Appended Note 2)

The data processor described in Appended note 1, wherein the communication unit transmits, in response to a determination request from each of the multiple microscope devices, a determination result to a microscope device, which is a transmission source of the determination request, the control unit generates the determination result indicating whether a state of the microscope device, which is a transmission source of the determination request, is in a normal state or in an abnormal state based at least on the determination request, and the determination request includes at least sample information to specify a sample of which an image is captured by a second imaging device in the microscope device, which is a transmission source of the determination request, image quality information of the image obtained by the second imaging device, and information indicating a state of a second switching unit in the microscope device, which is a transmission source of the determination request.

(Appended Note 3)

The data processor according to Appended note 3, wherein the communication unit receives the master setting information from a first microscope device that is one of the multiple microscope devices, the storage unit stores the master setting information received from the first microscope device.

(Appended Note 4)

A microscope device that is used in multiple types of microscopy and is connected to a network, including:

a receiving unit configured to receive an operation of a user of the microscope device, a control unit configured to generate own-device-setting information including multiple pieces of customizing setting information that correspond to the multiple types of microscopy based on the operation received by the receiving unit, and a communication unit configured to transmit the own-device-setting information generated by the control unit to a data processor as master setting information by communicating with the data processor over the network.

(Appended Note 5)

A system, including the microscope device described in Appended note 4, and the data processor described in Appended note 1.

(Appended Note 6)

An operation method of a microscope device that is used in multiple types of microscopy and is connected to a network, including:

receiving master setting information from a data processor by communicating with the data processor over the network, wherein the master setting information includes multiple pieces of customizing setting information that correspond to the multiple types of microscopy; and registering or updating own-device-setting information of the microscope device in accordance with the received master setting information.

(Appended Note 7)

An operation method of a microscope device that is used in multiple types of microscopy and is connected to a network, including:

generating own-device-setting information including multiple pieces of customizing setting information that correspond to the multiple types of microscopy based on an operation of a user of the microscope device; and transmitting the generated own-device-setting information to a data processor as master setting information by communicating with the data processor over the network.

(Appended Note 8)

An operation method of a data processor that communicates with a microscope device that is used in multiple types of microscopy over a network, including transmitting master setting information in response to a setting information request from each of the multiple microscope devices by communicating with each of the multiple microscope devices over the network, wherein the master setting information includes multiple pieces of customizing setting information that correspond to the multiple types of microscopy.

What is claimed is:

1. A microscope device that is used in a plurality of types of microscopy and is connected to a network, the microscope device comprising:

a motor-driven unit placed on an optical path of the microscope device;

a control unit; and a communication unit configured to communicate with a data processor connected to a plurality of other microscope devices over the network, wherein the communication unit is configured to receive, from the data processor, a master setting information including a plurality of pieces of customizing setting information that correspond to the plurality of types of microscopy, wherein the control unit is configured to:

perform one of, register and update own-device-setting information of the microscope device to include the plurality of pieces of customizing setting information of the master setting information received by the communication unit; and change, without manual input, a setting of the motor-driven unit in accordance with one piece of customizing setting information of the plurality of pieces of customizing setting information corresponding to one of the plurality of types of microscopy being used, wherein the communication unit is configured to receive, from the data processor, a plurality of pieces of target image quality information that correspond to the plurality of types of microscopy, and wherein the control unit is configured to change a setting of the motor-driven unit to approach a target image quality indicated by a piece of target image quality information of the plurality of pieces of target image quality information corresponding to one of the plurality of types of microscopy being used.

2. The microscope device according to claim 1, wherein the target image quality information is information for absorbing individual differences of the microscope devices and realizing a certain level of inspection quality.

3. The microscope device according to claim 2, wherein the target image quality information includes at least one of a target contrast and a target frame rate.

4. The microscope device according to claim 1, further comprising:

a switching unit having a plurality of mounting positions for mounting optical devices, wherein the switching unit is configured to place, on the optical path of the microscope device, an optical device selected from the optical devices mounted on the switching unit, wherein the master setting information includes mount setting information indicating correspondence between the plurality of mounting positions and the optical devices to be mounted on the plurality of mounting positions.

5. The microscope device according to claim 4, further comprising:

an imaging device configured to perform autoexposure control and is placed on the optical path of the microscope device, wherein the communication unit is configured to transmit, to the data processor, a determination request including at least sample information to specify a sample of which an image is captured by the imaging device, information indicating exposure time of the imaging device, and information indicating a state of the switching unit, and wherein the control unit is configured to detect abnormality of the microscope device based on a response to the determination request from the data processor, and report the abnormality of the microscope device when the abnormality of the microscope device is detected.

6. The microscope device according to claim 4, further comprising:

an imaging device configured to perform autoexposure control and is placed on the optical path of the microscope device, wherein the communication unit is configured to transmit, to the data processor, a determination request including at least sample information to specify a sample of which an image is captured by the imaging device, image quality information of an image of the sample obtained by the imaging device, and information indicating a state of the switching unit, and wherein the control unit is configured to detect abnormality of the microscope device based on a response to the determination request from the data processor, and report the abnormality of the microscope device when the abnormality of the microscope device is detected.

7. The microscope device according to claim 1, wherein each of the plurality of pieces of customizing setting information is information indicating a setting of the motorized unit.

8. A microscope device that is used in a plurality of types of microscopy and is connected to a network, the microscope device comprising:

a motor-driven unit placed on an optical path of the microscope device;

a receiving unit configured to receive an operation of a user of the microscope device;

a control unit configured to generate own-device-setting information including a plurality of pieces of customizing setting information that correspond to the plurality of types of microscopy based on the operation received by the receiving unit; and a communication unit configured to transmit, to a data processor, the own-device-setting information generated by the control unit as master setting information by communicating with the data processor connected to a plurality of microscope devices over the network, wherein the communication unit is configured to receive, from the data processor, a plurality of pieces of target image quality information that correspond to the plurality of types of microscopy, and wherein the control unit is configured to change a setting of the motor-driven unit to approach a target image quality indicated by a piece of target image quality information of the plurality of pieces of target image quality information corresponding to one of the plurality of types of microscopy being used.

9. The microscope device according to claim 8, further comprising:

a switching unit having a plurality of mounting positions for mounting optical devices, wherein the switching unit places, on an optical path of the microscope device, an optical device selected from the optical devices mounted on the switching unit, wherein the own-device-setting information includes mount setting information indicating correspondence between the plurality of mounting positions and the optical devices to be mounted on the plurality of mounting positions.

10. The microscope device according to claim 9, further comprising:

an imaging device that is configured to perform autoexposure control and is placed on the optical path of the microscope device; and a display device configured to display an image of a sample obtained by the imaging device, wherein the control unit determines whether the image displayed on the display device is favorable or not based on the operation received by the receiving unit, and wherein the communication unit transmits, to the data processor, learning information including at least sample information to specify the sample of which the image is captured by the imaging device, information indicating exposure time of the imaging device, and information indicating a state of the switching unit, when the control unit determines the image displayed on the display device to be favorable.

11. The microscope device according to claim 9, further comprising:

an imaging device configured to perform autoexposure control and is placed on the optical path of the microscope device; and a display device configured to display an image of a sample obtained by the imaging device, wherein the control unit configured to determine whether the image displayed on the display device is favorable or not based on the operation received by the receiving unit, and wherein the communication unit is configured to transmit, to the data processor, learning information including at least sample information to specify the sample of which the image is captured by the imaging device, image quality information of the image obtained by the imaging device, and information indicating a state of the switching unit, when the control unit determines the image displayed on the display device to be favorable.

12. The microscope device according to claim 8, wherein each of the plurality of pieces of customizing setting information is information indicating a setting of the motorized unit.

13. A system comprising:

a data processor; and a plurality of microscope devices configured to communicate with the data processor over a network, wherein each of the plurality of microscope devices is used in a plurality of types of microscopy, wherein each of the plurality of microscope devices comprises:
a motor-driven unit placed on an optical path of the each of the plurality of microscope devices;
a control unit; and
a communication unit configured to communicate with the data processor over the network,
wherein the communication unit is configured to receive, from the data processor, a master setting information including a plurality of pieces of customizing setting information that correspond to the plurality of types of microscopy,
wherein the control unit configured to:
perform one of, register and update own-device-setting information of the each of the plurality of microscope devices to include the plurality of pieces of customizing setting information of the master setting information received by the communication unit; and
change, without manual input, a setting of the motor-driven unit in accordance with one piece of customizing setting information of the plurality of pieces of customizing setting information corresponding to one of the plurality of types of microscopy being used,
wherein the communication unit is configured to receive, from the data processor, a plurality of pieces of target image quality information that correspond to the plurality of types of microscopy, and
wherein the control unit is configured to change a setting of the motor-driven unit to approach a target image quality indicated by a piece of target image quality information of the plurality of pieces of target image quality information corresponding to one of the plurality of types of microscopy being used, and
wherein the data processor is configured to:
control a storage unit to store the master setting information and the plurality of pieces of target image quality information; and
control a communication unit to transmit, in response to a setting information request from the each of the plurality of microscope devices, the master setting information and the plurality of pieces of target image quality information to the each of the plurality of microscope devices.

14. The system according to claim 13,
wherein the data processor is configured to:
control the communication unit to receive, from a first microscope device, that is one of the plurality of microscope devices, learning information including at least sample information to specify a sample of an image that is captured by a first imaging device included in the first microscope device, information indicating exposure time of the first imaging device, and information indicating a state of a first switching unit included in the first microscope device; and
perform one of, register and update determination information to determine whether a state of a microscope device is in a normal state or in an abnormal state based on the learning information.

15. The system according to claim 14,
wherein the data processor is configured to:
control the communication unit to transmit, in response to a determination request from each of the plurality of microscope devices, a determination result to the microscope device, which is a transmission source of the determination request; and generate the determination result indicating whether the microscope device is in a normal state or in an abnormal state based on the determination request and the determination information, and
wherein the determination request includes at least sample information to specify a sample of which an image is captured by a second imaging device in the microscope device, which is a transmission source of the determination request, information indicating exposure time of the second imaging device, and information indicating a state of a second switching unit in the microscope device, which is a transmission source of the determination request.

16. The system according to claim 13,
wherein the data processor is configured to:
control the communication unit to receive, from a first microscope device that is one of the plurality of microscope devices, learning information including at least sample information to specify a sample of an image that is captured by a first imaging device included in the first microscope device, image quality information of the image obtained by the first imaging device, and information indicating a state of a first switching unit included in the first microscope device; and
perform one of register and update determination information to determine whether a microscope device is in a normal state or in an abnormal state based on the learning information received from the first microscope device.

17. The system according to claim 16,
wherein the data processor is configured to:
control the communication unit to transmit, in response to a determination request from each of the plurality of microscope devices, a determination result to a microscope device, which is a transmission source of the determination request; and
generate the determination result indicating whether the microscope device, which is a transmission source of the determination request, is in a normal state or in an abnormal state based on the determination request and the determination information, and
wherein the determination request includes at least sample information to specify a sample of which an image is captured by a second imaging device in the microscope device, which is a transmission source of the determination request, image quality information of the image obtained by the second imaging device, and information indicating a state of a second switching unit in the microscope device, which is a transmission source of the determination request.

18. The system according to claim 13,
wherein the data processor is configured to:
control the communication unit to transmit, in response to a determination request from each of the plurality of microscope devices, a determination result to a microscope device, which is a transmission source of the determination request; and
generate the determination result indicating whether the microscope device is in a normal state or in an abnormal state based at least on the determination request, and
wherein the determination request includes at least sample information to specify a sample of which an image is captured by a second imaging device in the microscope device, which is a transmission source of the determination request, information indicating exposure time of the second imaging device, and information indicating a state of a second switching unit in the microscope device, which is a transmission source of the determination request.

* * * * *